(12) United States Patent
Pomeroy et al.

(10) Patent No.: US 12,708,215 B2
(45) **Date of Patent: *Aug. 18, 2026**

(54) HEATING-CAPABLE SEATING UNIT WITH DRAINING ELEMENT

(71) Applicant: Wrmth Corp., Coldwater (CA)

(72) Inventors: John W. Pomeroy, Toronto (CA); Sally Jean Daub, Toronto (CA); Theodore Charles Shropshire, Toronto (CA)

(73) Assignee: Wrmth Corp., Coldwater (CA)

( * ) Notice: Subject to any disclaimer, the term of this patent is extended or adjusted under 35 U.S.C. 154(b) by 141 days.

This patent is subject to a terminal disclaimer.

(21) Appl. No.: 18/774,075

(22) Filed: Jul. 16, 2024

(65) Prior Publication Data

US 2024/0365994 A1 Nov. 7, 2024

Related U.S. Application Data

(63) Continuation of application No. 17/656,111, filed on Mar. 23, 2022, now Pat. No. 12,279,701, which is a (Continued)

(51) Int. Cl.

*A47C 31/00* (2006.01)
*A47B 13/00* (2006.01)

(Continued)

(52) U.S. Cl.

CPC ............ *A47C 31/008* (2013.01); *A47B 13/00* (2013.01); *A47C 7/723* (2018.08); *A47C 7/725* (2013.01);

(Continued)

(58) Field of Classification Search

CPC ....... A47C 7/748; A47C 31/008; A47C 7/727; A47C 7/723; A47C 7/725; A47C 7/744; A47B 13/00

See application file for complete search history.

(56) References Cited

U.S. PATENT DOCUMENTS 7,866,743 B1 1/2011 Russell
7,963,594 B2 6/2011 Wolas (Continued)

FOREIGN PATENT DOCUMENTS

CN 208954572 6/2019
DE 202013104029 U1 * 12/2014 ............. A47C 7/727
WO WO2016/023084 A1 2/2016

OTHER PUBLICATIONS

Canada Intellectual Property Office; Office Action; Application No. 3153861; May 10, 2023; 3 pgs.

(Continued)

*Primary Examiner* — Anthony D Barfield

(74) *Attorney, Agent, or Firm* — Katz Ruby & Carle LLP; Bruce E. Stuckman; Katherine C. Stuckman

(57) ABSTRACT

A seating unit includes a seat back having a front side and a back side, and a seat bottom having a top side and an underside. A first heating element of the seating unit, attached to the back side of the seat back, can be configured to deliver first heating through the seat back to a user while seated in the seating unit when electrically powered. A second heating element of the seating unit, attached to the underside of the seat bottom, can be configured to deliver second heating through the seat bottom to the user while seated in the seating unit when electrically powered. The seating unit can further include circuitry configured to facilitate delivery of power to the first heating element and the second heating element.

20 Claims, 22 Drawing Sheets

Related U.S. Application Data continuation-in-part of application No. 17/457,098, filed on Dec. 1, 2021, now Pat. No. 11,889,929.

(60) Provisional application No. 63/168,695, filed on Mar. 31, 2021, provisional application No. 63/120,906, filed on Dec. 3, 2020.

(51) Int. Cl.

| | |
|---|---|
| ***A47C 7/72*** | (2006.01) |
| ***A47C 7/74*** | (2006.01) |
| ***G06T 19/00*** | (2011.01) |
| ***G06V 10/60*** | (2022.01) |
| ***G06V 10/62*** | (2022.01) |
| ***G06V 10/74*** | (2022.01) |
| ***G06V 20/00*** | (2022.01) |

(52) U.S. Cl.

CPC .............. *A47C 7/727* (2018.08); *A47C 7/744* (2013.01); *A47C 7/748* (2013.01); *G06T 19/006* (2013.01); *G06V 10/60* (2022.01); *G06V 10/62* (2022.01); *G06V 10/761* (2022.01); *G06V 20/38* (2022.01)

(56) References Cited

U.S. PATENT DOCUMENTS

| | | | |
|---|---|---|---|
| 10,463,148 | B2 | 11/2019 | Gober |
| 11,363,890 | B2 | 6/2022 | Gober |
| 2006/0254172 | A1 | 11/2006 | Arnold |
| 2007/0267399 | A1 | 11/2007 | Flores |
| 2008/0142494 | A1 | 6/2008 | Blake et al. |
| 2013/0213950 | A1 | 8/2013 | Bulgajewski |
| 2018/0271287 | A1 | 9/2018 | Jacobs |
| 2019/0111813 | A1 | 4/2019 | Hoshi et al. |
| 2019/0325498 | A1 | 10/2019 | Clark |
| 2023/0080374 | A1 | 3/2023 | Gober |

OTHER PUBLICATIONS

Canada Intellectual Property Office; Office Action; CA Application No. 3, 141,037; Mar. 1, 2023; 6 pgs.

Canada Intellectual Property Office; Office Action; CA Application No. 3, 141,037; Jan. 8, 2024; 5 pgs.

Canada Intellectual Property Office; Office Action; Application No. 3153861; Feb. 7, 2025; 3 pgs.

* cited by examiner heating element 102 heating element 102 furnishing unit 110 furnishing unit 110 furnishing unit 110

PCB element 133

PCB element 133

PCB element 133 seating unit 112 seating unit 112

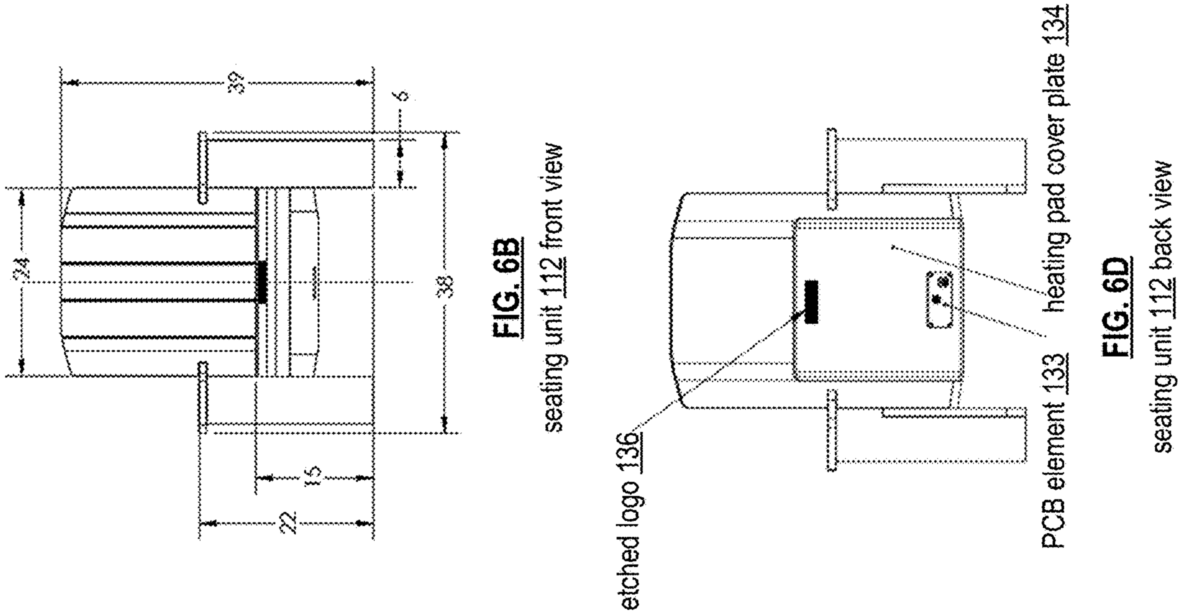
FIG. 6B
seating unit 112 front view
FIG. 6D
seating unit 112 back view
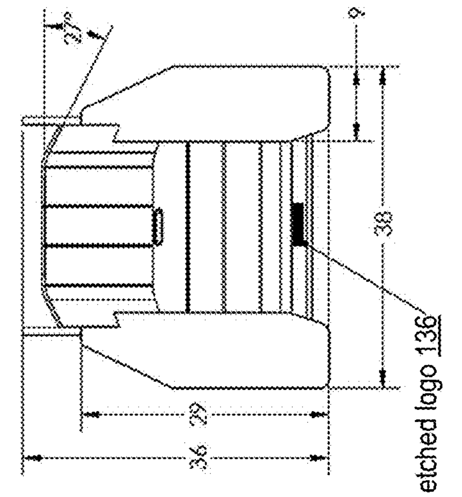
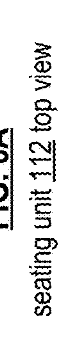
FIG. 6A
seating unit 112 top view
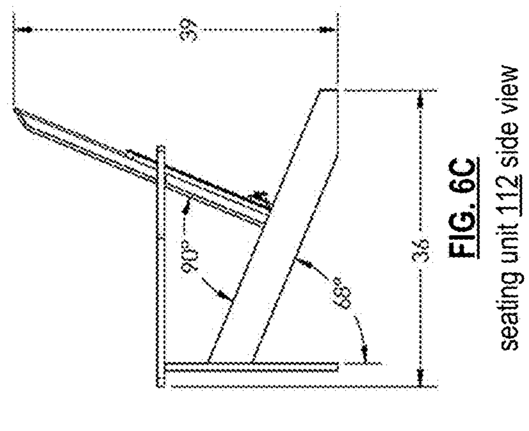
FIG. 6C
seating unit 112 side view seat frame 124 front view seat frame 124 side view seat frame 124 top view seat frame 124 side view

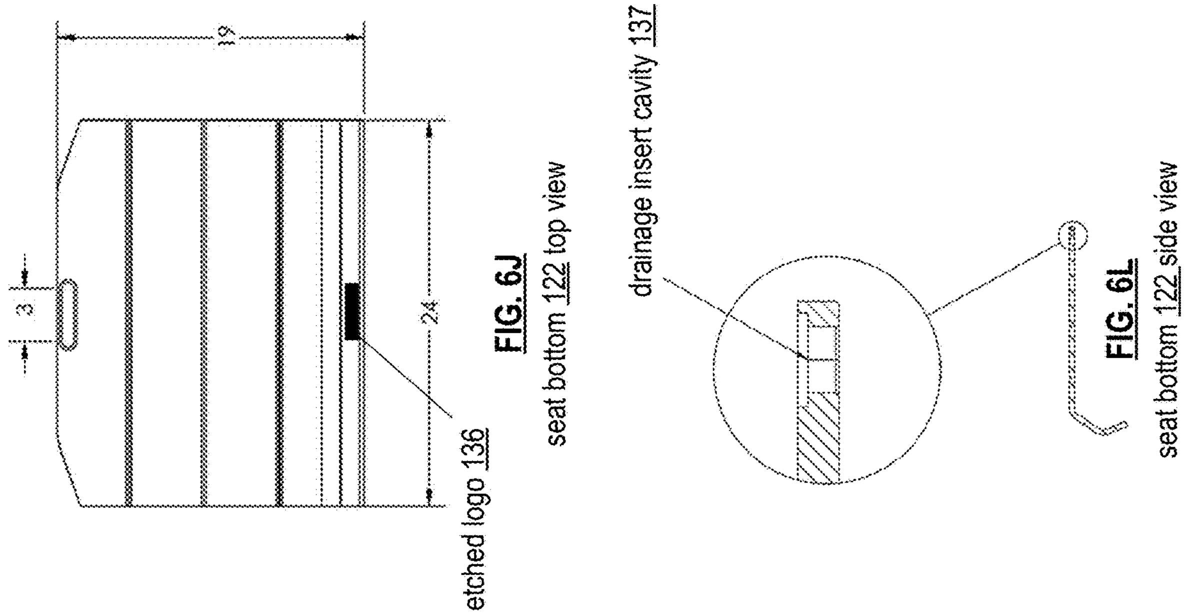
FIG. 6J
seat bottom 122 top view
FIG. 6L
seat bottom 122 side view
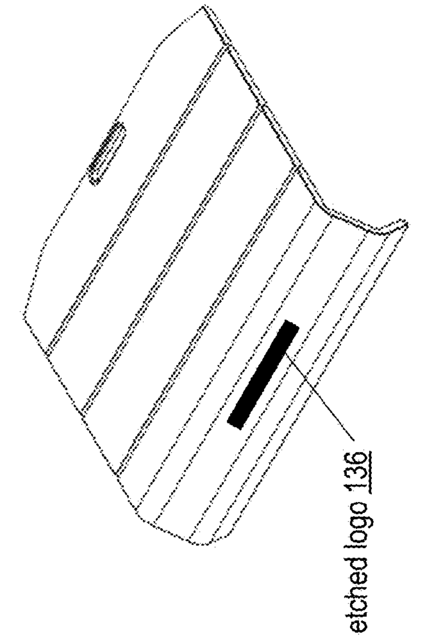
FIG. 6I
seat bottom 122 3D front view
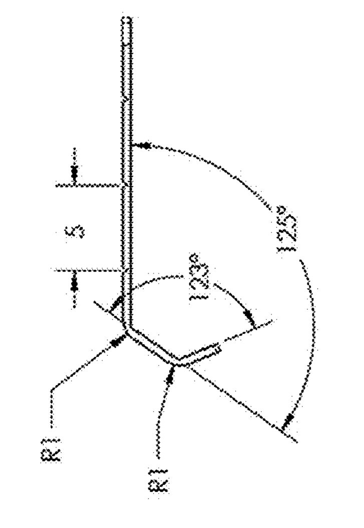
FIG. 6K
seat bottom 122 side view

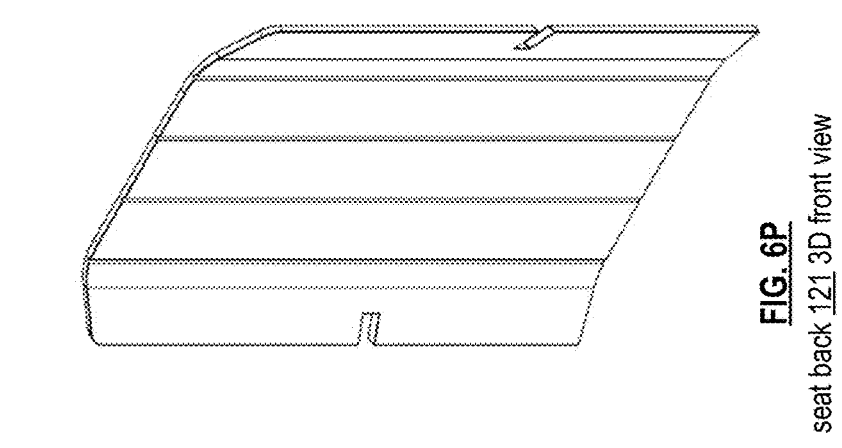
FIG. 6P
seat back 121 3D front view
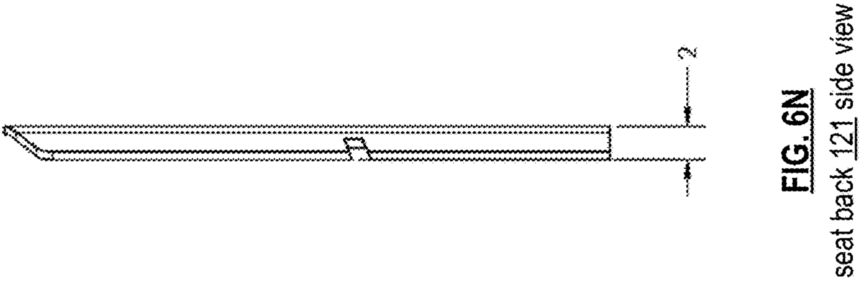
FIG. 6N
seat back 121 side view
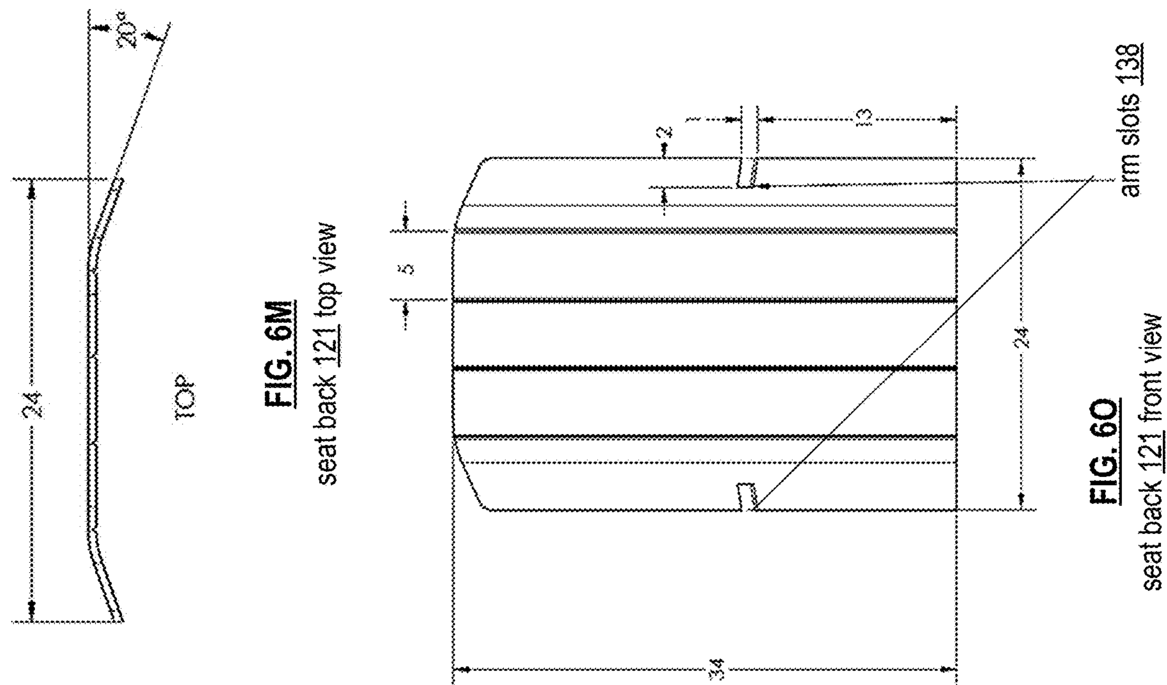
FIG. 6M
seat back 121 top view
FIG. 6O
seat back 121 front view seat arm 123 top view seat arm 123 side view seat arm 123 top 3D view

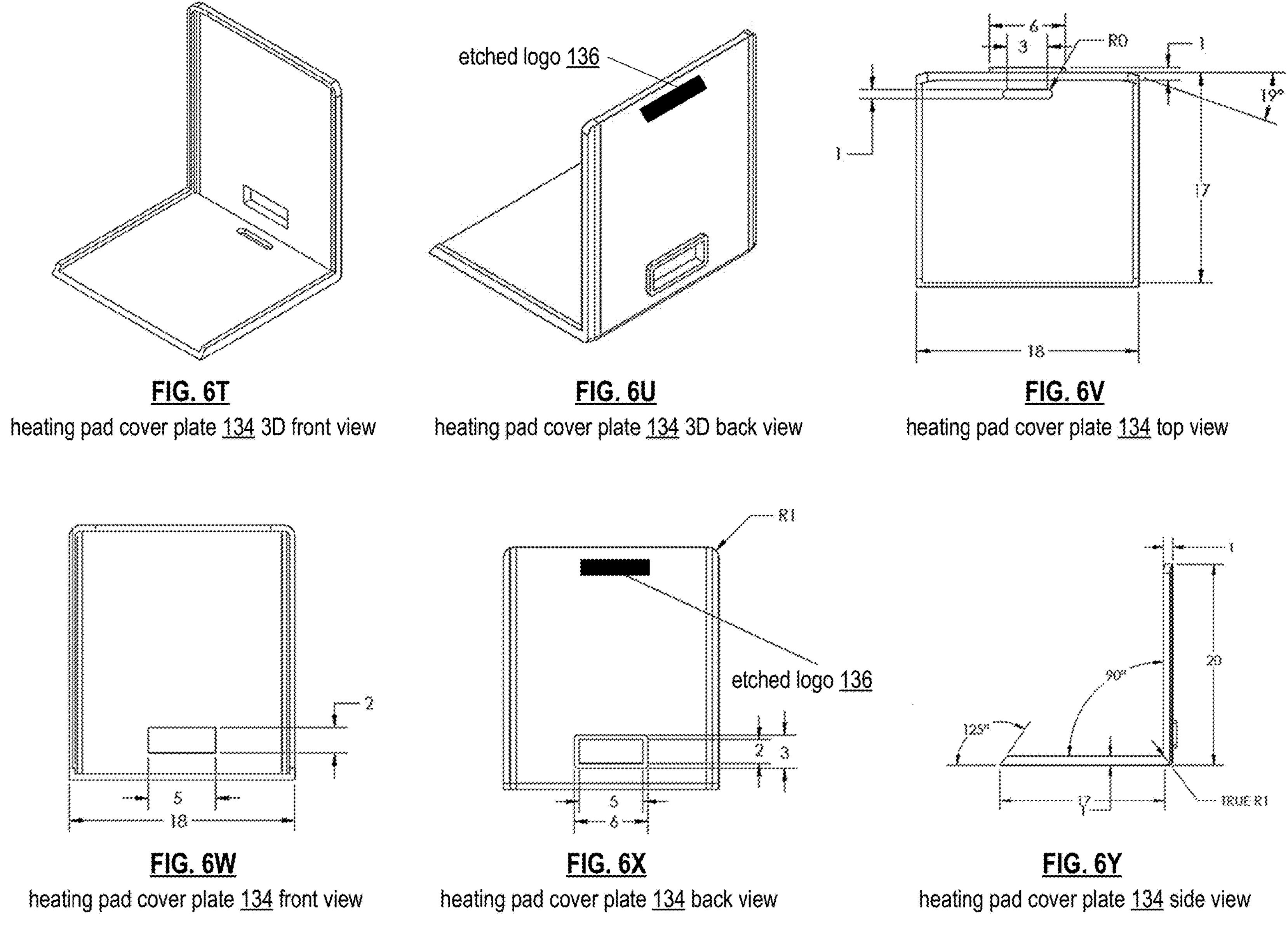
FIG. 6T heating pad cover plate 134 3D front view
FIG. 6U heating pad cover plate 134 3D back view
FIG. 6V heating pad cover plate 134 top view
FIG. 6W heating pad cover plate 134 front view
FIG. 6X heating pad cover plate 134 back view
FIG. 6Y heating pad cover plate 134 side view

HEATING-CAPABLE SEATING UNIT WITH DRAINING ELEMENT

CROSS-REFERENCE TO RELATED APPLICATIONS

The present U.S. Utility Patent Application claims priority pursuant to 35 U.S.C. § 120 as a continuation of U.S. Utility application Ser. No. 17/656,111, entitled "CONTROLLING ELEMENTS OF FURNISHING UNITS", filed Mar. 23, 2022, which is a continuation-in-part of U.S. Utility application Ser. No. 17/457,098, entitled "HEATING-CAPABLE FURNISHING UNIT", filed Dec. 1, 2021, issued as U.S. Pat. No. 11,889,929 on Feb. 6, 2024, which claims priority pursuant to 35 U.S.C. § 119 (e) to U.S. Provisional Application No. 63/120,906, entitled "HEAT-CAPABLE FURNITURE", filed Dec. 3, 2020, each of which are hereby incorporated herein by reference in their entirety and made part of the present U.S. Utility Patent Application for all purposes.

U.S. Utility application Ser. No. 17/656,111 also claims priority pursuant to 35 U.S.C. § 119(e) to U.S. Provisional Application No. 63/168,695, entitled "FACILITATING EXPERIENCES BASED ON PROXIMITY-BASED INTERACTIONS WITH FURNISHING UNITS", filed Mar. 31, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to heating systems and furniture.

BRIEF DESCRIPTION OF THE SEVERAL VIEWS OF THE DRAWING(S)

FIG. 1 presents a graphical illustration of an embodiment of a furnishing unit that includes at least one heating element in accordance with various embodiments.

FIG. 2A presents a graphical illustration of an embodiment of a heating element in accordance with various embodiments.

FIG. 2B presents a deconstructed, layered illustration of an example embodiment of a heating element in accordance with various embodiments.

FIGS. 3A-3C are schematic block diagrams of embodiments of a furnishing unit in accordance with various embodiments;

FIG. 3D presents a graphical illustrations of an example embodiment of a PCB (printed circuit board) element of a furnishing unit in accordance with various embodiments;

FIG. 3E presents a deconstructed, layered illustration of an example embodiment of a PCB element of a furnishing unit in accordance with various embodiments;

FIG. 3F presents a side view graphical illustration of an example embodiment of a PCB of a furnishing unit in accordance with various embodiments;

FIG. 3G presents a back view graphical illustration of an example embodiment of a PCB of a furnishing unit in accordance with various embodiments;

Figures 4A, 4B, 4C:
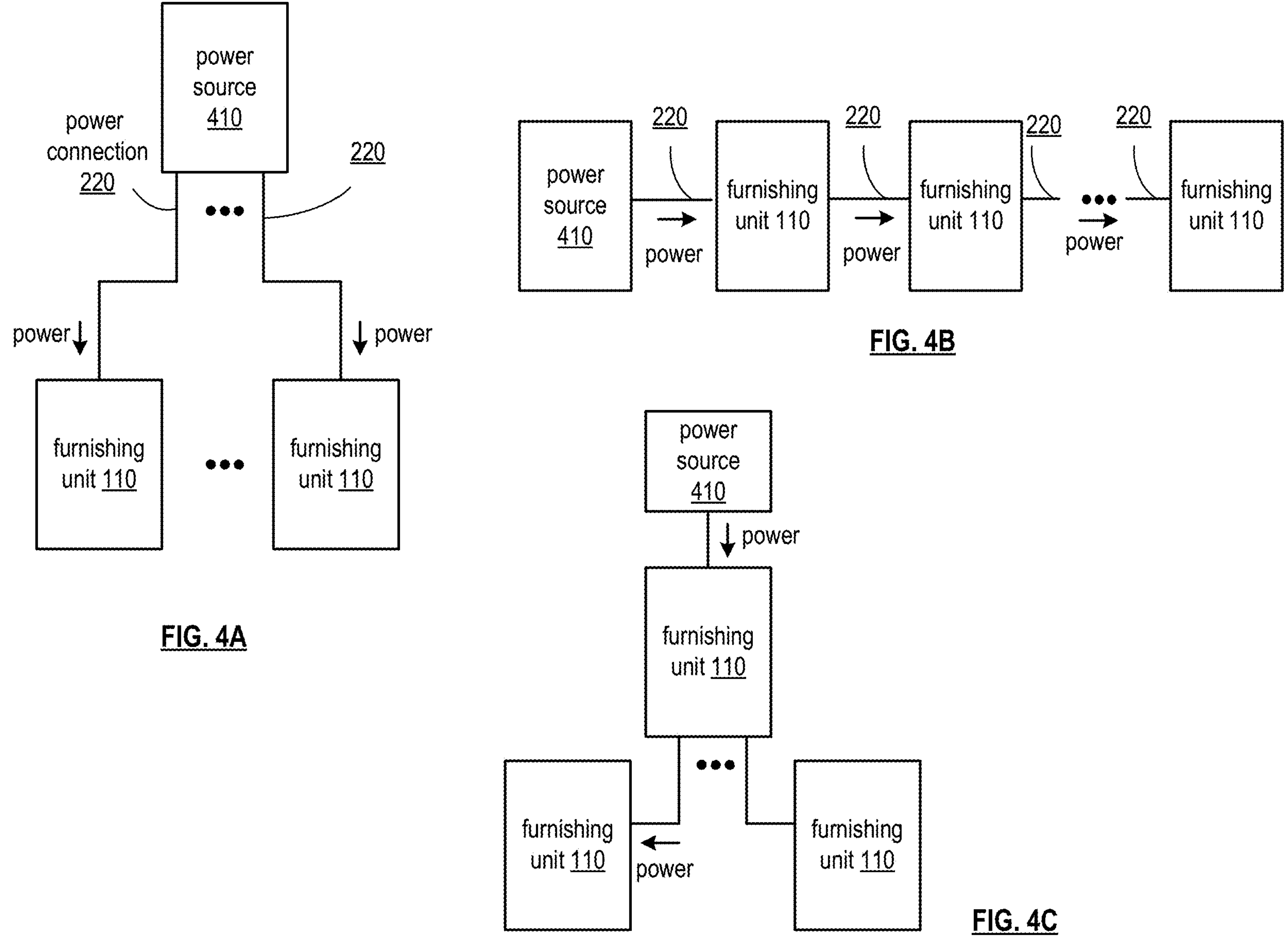
FIGS. 4A-4C are schematic block diagrams illustrating example power connections between members of a group of multiple furnishing units in accordance with various embodiments.
Figures 4D, 4E, 4F:
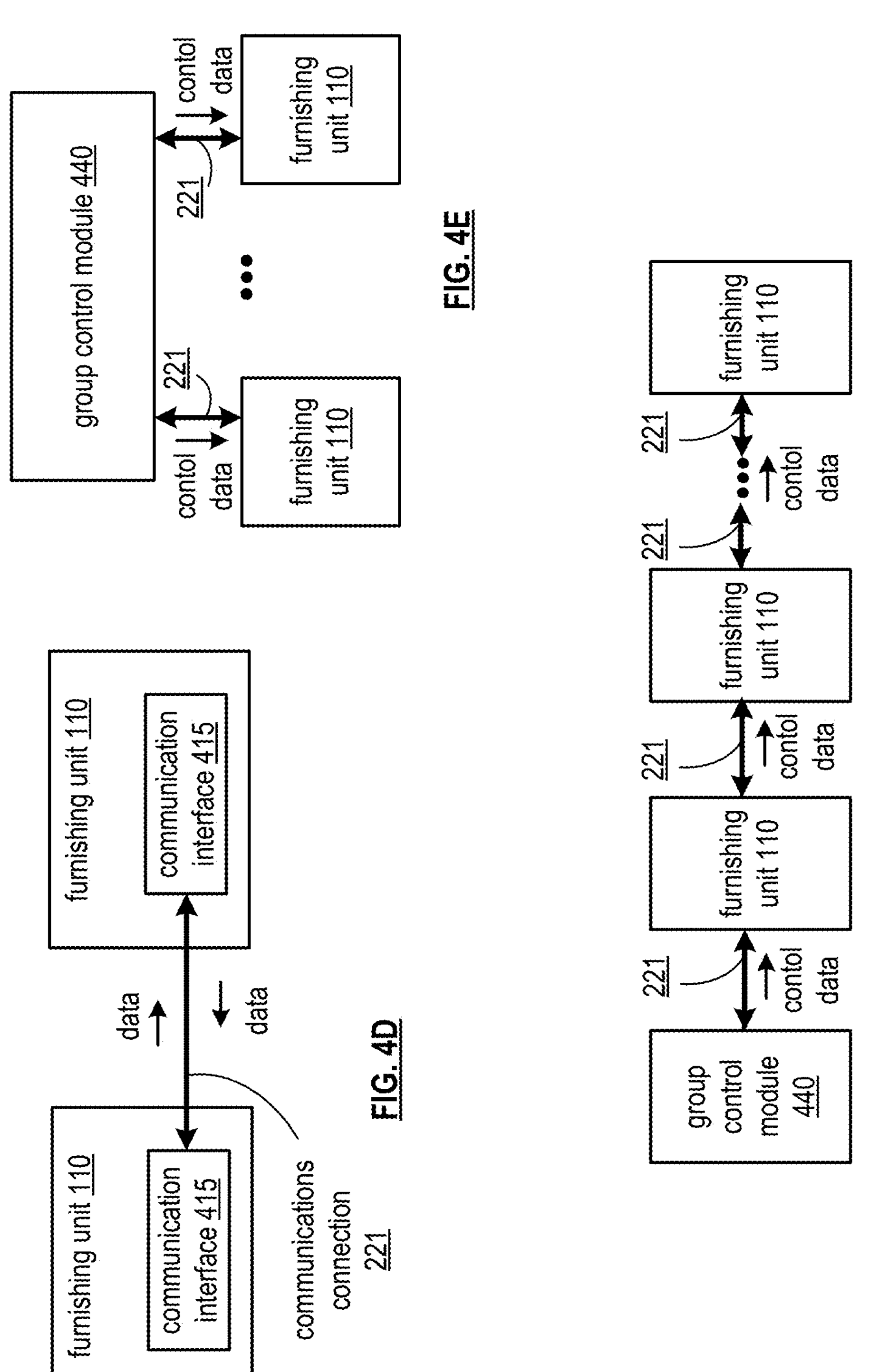
FIGS. 4D-4F are schematic block diagrams illustrating example communications connections between members of a group of multiple furnishing units in accordance with various embodiments.
Figure 4G:
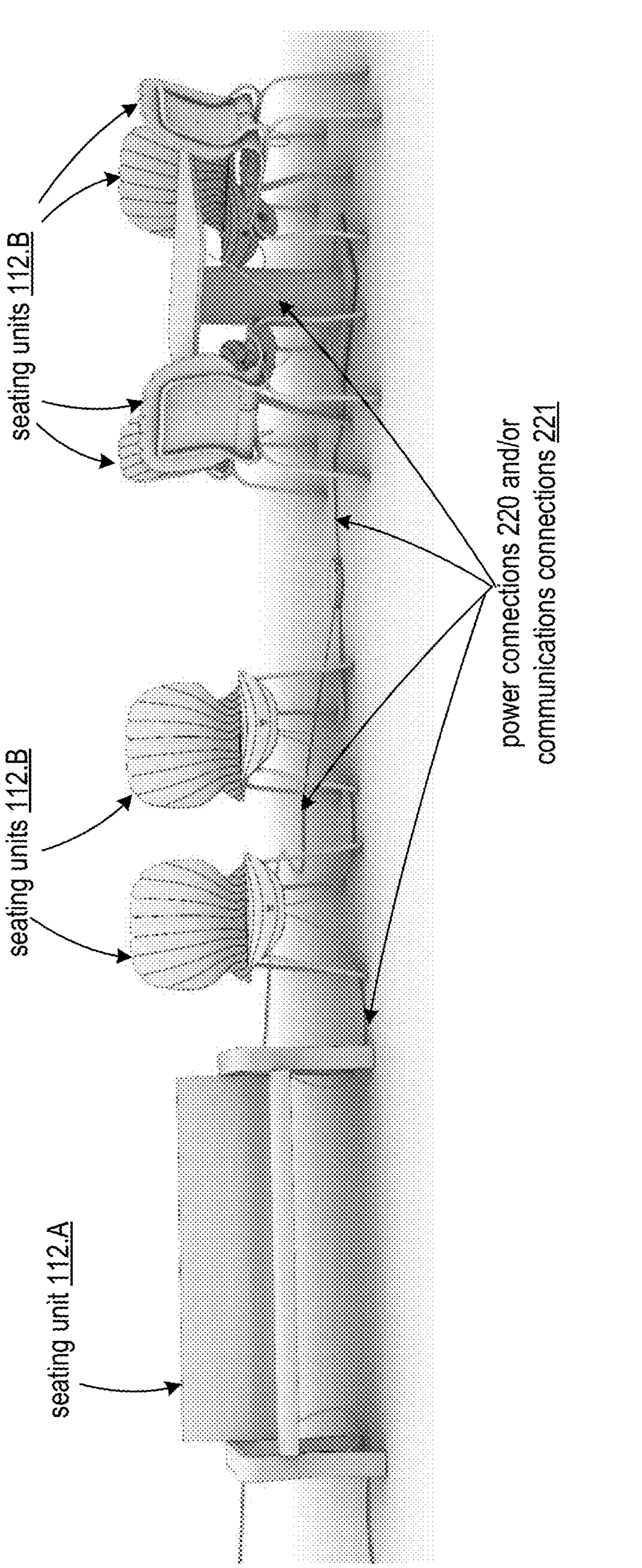
Figure 4H:
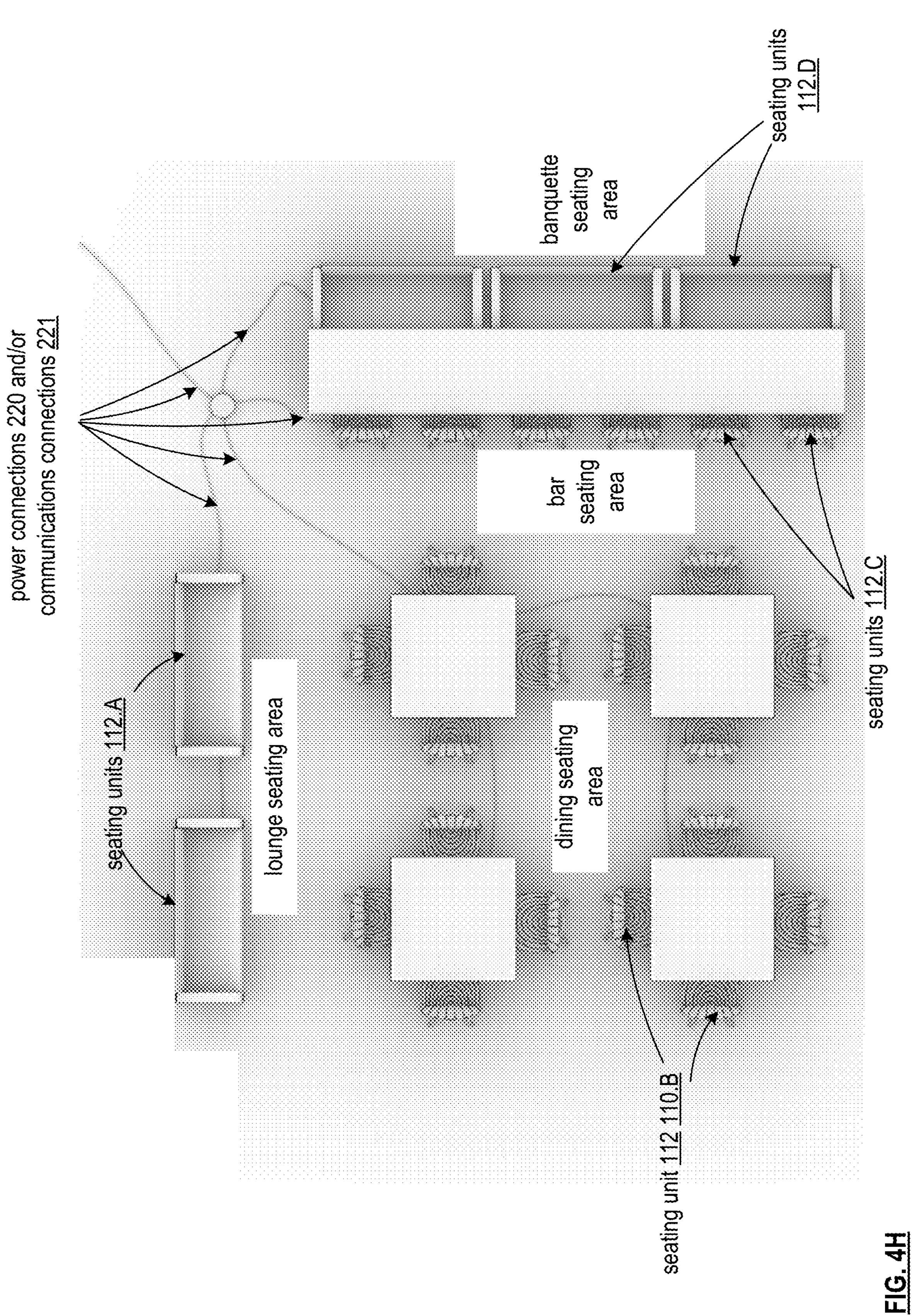
Figure 5A:
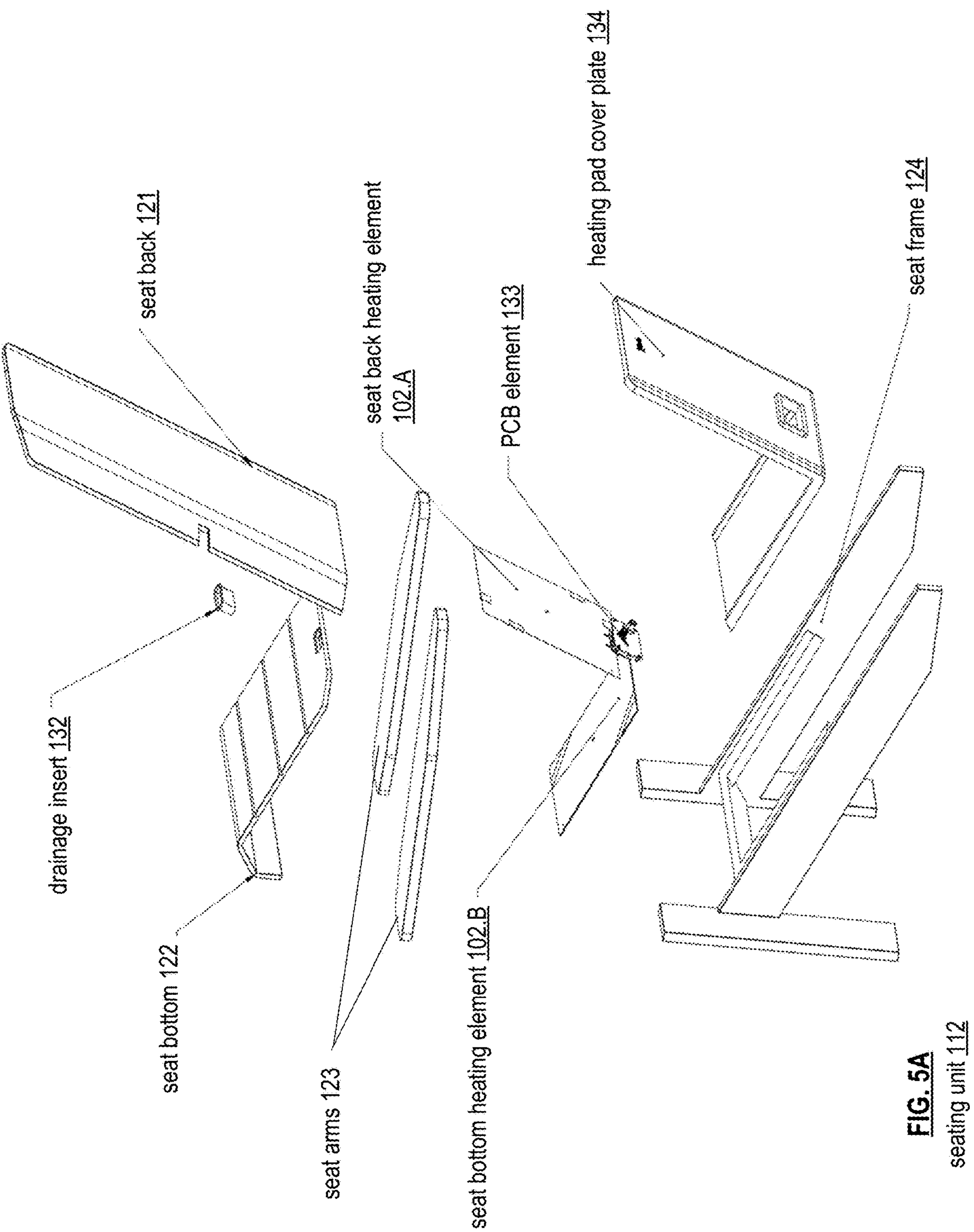
Figure 5B:
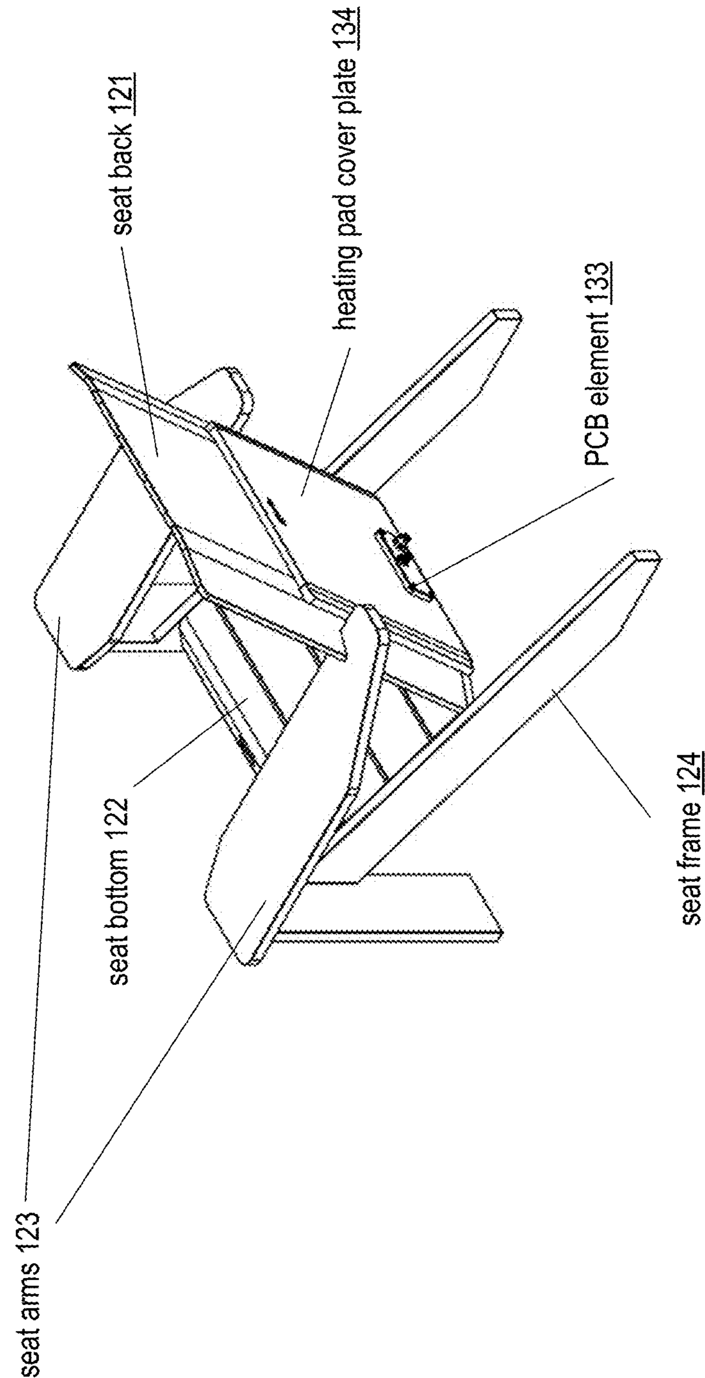
Figure 6F:
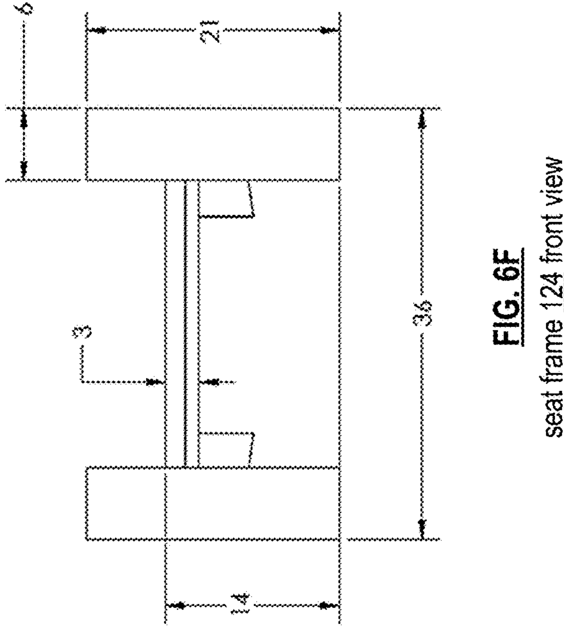
Figure 6H:
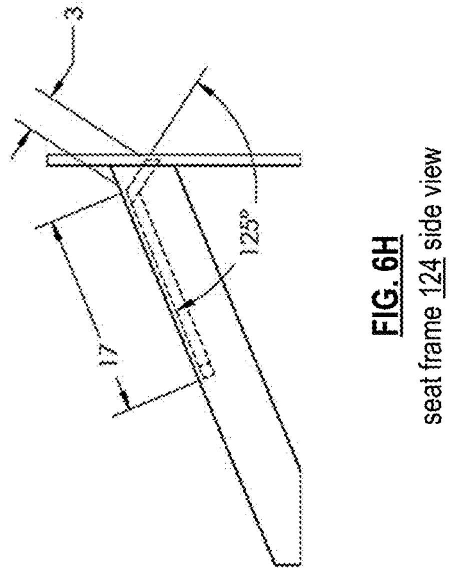
Figure 6E:
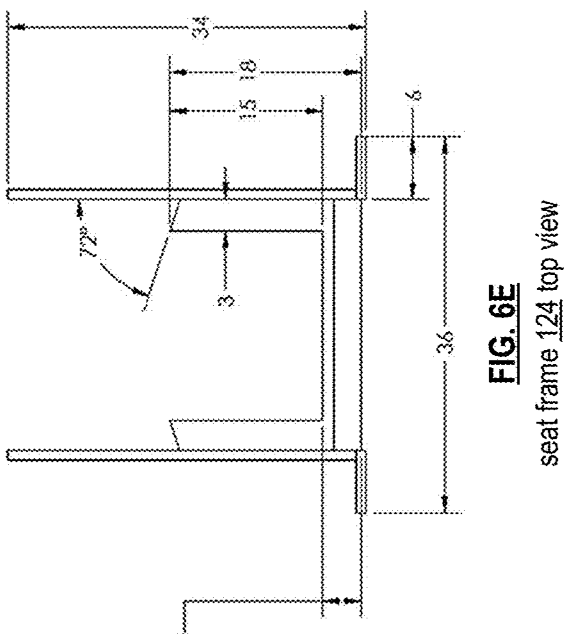
Figure 6G:
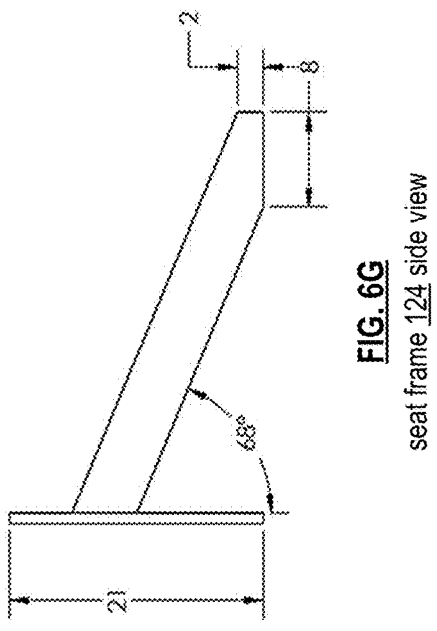
Figure 6S:
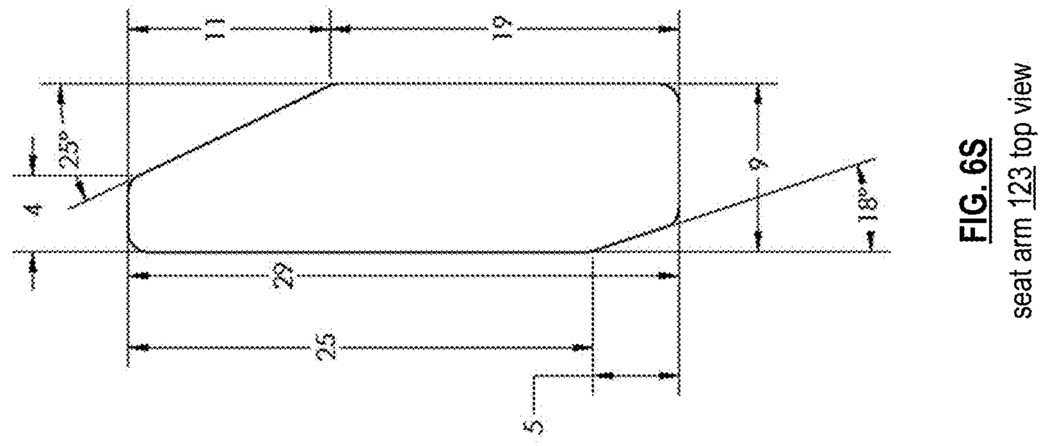
Figure 6R:
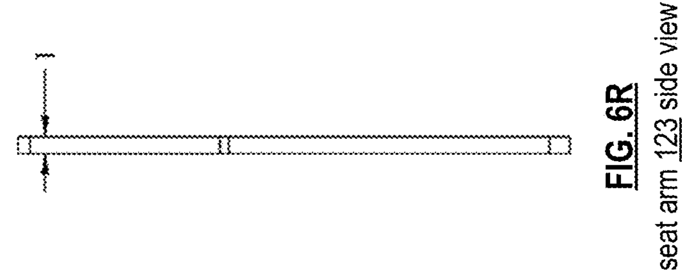
Figure 6Q:
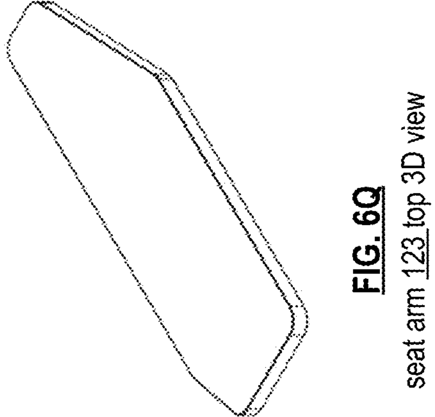

FIGS. 4G-4H present graphical illustration of example groups of multiple furnishing units connected via power connections and/or communications connections in accordance with various embodiments;

FIG. 5A presents a deconstructed, layered illustration of an example embodiment of a furnishing unit implemented as a seating unit in accordance with various embodiments;

FIG. 5B presents a three dimensional back view of an example embodiment of a seating unit in accordance with various embodiments;

FIG. 6A presents a two-dimensional top view of an example embodiment of a seating unit in accordance with various embodiments;

FIG. 6B presents a two-dimensional front view of an example embodiment of a seating unit in accordance with various embodiments;

FIG. 6C presents a two-dimensional side view of an example embodiment of a seating unit in accordance with various embodiments;

FIG. 6D presents a two-dimensional back view of an example embodiment of a seating unit in accordance with various embodiments;

FIG. 6E presents a two-dimensional top view of an example embodiment of a seat frame of a seating unit in accordance with various embodiments;

FIG. 6F presents a two-dimensional front view of an example embodiment of a seat frame in accordance with various embodiments;

FIG. 6G presents a two-dimensional side view of an example embodiment of a seat frame in accordance with various embodiments;

FIG. 6H presents a two-dimensional side view of an example embodiment of a seat frame in accordance with various embodiments;

FIG. 6I presents a three-dimensional front view of an example embodiment of a seat bottom of a seating unit in accordance with various embodiments;

FIG. 6J presents a two-dimensional top view of an example embodiment of a seat bottom in accordance with various embodiments;

FIG. 6K presents a two-dimensional side view of an example embodiment of a seat bottom in accordance with various embodiments;

FIG. 6L presents a two-dimensional side view of an example embodiment of a seat bottom in accordance with various embodiments;

FIG. 6M presents a two-dimensional top view of an example embodiment of a seat back of a seating unit in accordance with various embodiments;

FIG. 6N presents a two-dimensional side view of an example embodiment of a seat back in accordance with various embodiments;

FIG. 6O presents a two-dimensional front view of an example embodiment of a seat back in accordance with various embodiments;

FIG. 6P presents a three-dimensional front view of an example embodiment of a seat back in accordance with various embodiments;

FIG. 6Q presents a three-dimensional top view of an example embodiment of a seat arm of a seating unit in accordance with various embodiments;

FIG. 6R presents a two-dimensional side view of an example embodiment of a seat arm in accordance with various embodiments;

FIG. 6S presents a two-dimensional top view of an example embodiment of a seat arm in accordance with various embodiments;

FIG. 6T presents a three-dimensional front view of an example embodiment of a heating pad cover plate of a seating unit in accordance with various embodiments;

FIG. 6U presents a three-dimensional back view of an example embodiment of a heating pad cover plate in accordance with various embodiments;

FIG. 6V presents a two-dimensional top view of an example embodiment of a heating pad cover plate in accordance with various embodiments;

FIG. 6W presents a two-dimensional front view of an example embodiment of a heating pad cover plate in accordance with various embodiments;

FIG. 6X presents a two-dimensional back view of an example embodiment of a heating pad cover plate in accordance with various embodiments;

FIG. 6Y presents a two-dimensional side view of an example embodiment of a heating pad cover plate in accordance with various embodiments;

DETAILED DESCRIPTION OF THE INVENTION

Figure 1:
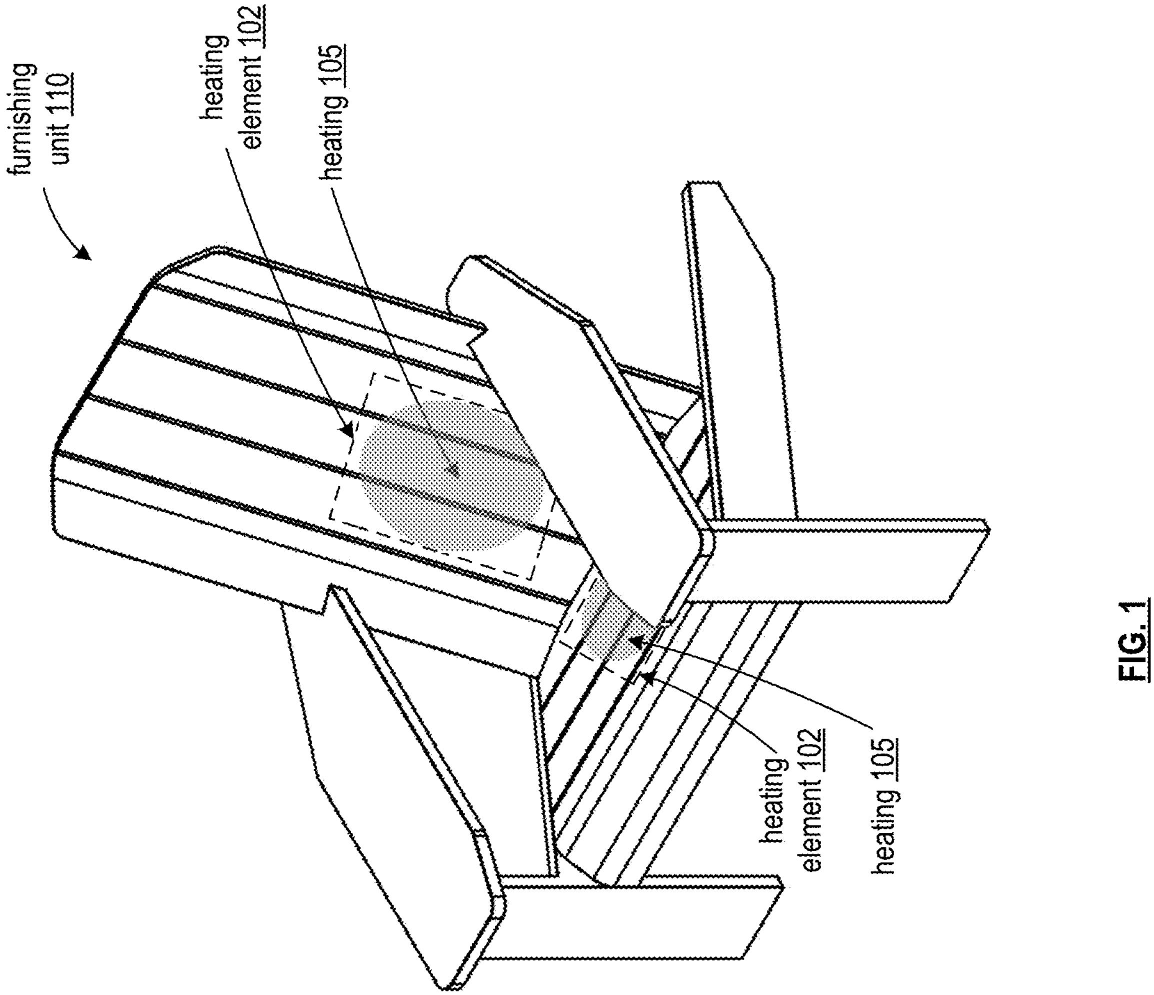

FIG. 1 illustrates a three-dimensional front view of an embodiment of heating-capable furnishing unit 110. A heating-capable furnishing unit 110 can include at least one heating element 102 be operable to provide heating 105 to a user in proximity to the heating-capable furnishing unit 110.

As used herein, a furnishing unit 110 can include a functional and/or decorative unit that is utilized in an indoor and/or outdoor environment, such as at a user's home, a commercial establishment, a park or recreational area, or other location. Furnishing units 110 can be permanently installed in a particular location, can be located in a predetermined location within a predefined physical boundary, and/or can move around within predefined physical boundary.

As depicted in the example of FIG. 1, a furnishing unit 110 can correspond to an article furniture such as a chair in which a user can sit. In other similar embodiments, furnishing unit 110 can correspond to another article of furniture implemented as a seating unit in which one or more people can sit, such as another type of chair, a couch, a stool, a bench, a banquette, and/or any other article of furniture providing means of sitting by the user. While seated in the furnishing unit 110, the at least one heating element 102 can provide heating 105 to the user.

Any embodiment of furnishing unit 110 that similarly includes at least one heating element 102 that provides heating 105 to at least one person in the vicinity can be implemented as: any other an article of furniture such as a table, bar-top, and/or other furniture providing a surface for dining, placing plates and/or glassware, and/or gathering; one or more furnishings providing lighting such as a lamp and/or light fixture; one or more furnishings providing heating such as an outdoor heating lamp; one or more furnishings providing music and/or other audio such as speakers; one or more furnishings providing decorative storage such as shelving units; window furnishings such as blinds and/or curtains; outdoor furnishings such as patio furniture, landscaping elements, rock features, floral features, plant features, outdoor sculptures and/or art, and/or water features; pools, hot tubs, and/or elements within a pool and/or hot tub, such as benches, rocks, pool sides, a pool bottom, and/or other elements of a pool that are optionally submerged when the pool and/or hot tub is filled with water and operable to heat occupants within the pool and/or hot tub; configurable elements upon furnishings such as decorative handles, knobs, hooks, and/or faucets; vehicles such as cars, boats, planes, other road vehicles, other water vehicles, and/or other aerial vehicles; structural elements such as walls, floors, ceilings, pillars, beams, bricks, stones; and/or any other articles of furniture, decorative units, functional units, accessories, infrastructure elements, and/or other types of products of a building interior, outdoor patio, and/or any other indoor and/or outdoor space.

In various embodiments, one or more furnishing units 110 are deployed in an outside environment where people gather and where the air temperature may become uncomfortably cold. The furnishing units 110 can provide heating to users to combat these cold temperatures to provide comfort to users while in this cold environment.

Alternatively or in addition, one or more furnishing units 110 can be implemented as cooling-capable furniture for outside situations where the air temperature may become uncomfortably warm, and can be operable to cool the user via at least one fan and/or other cooling system.

Figure 2A:
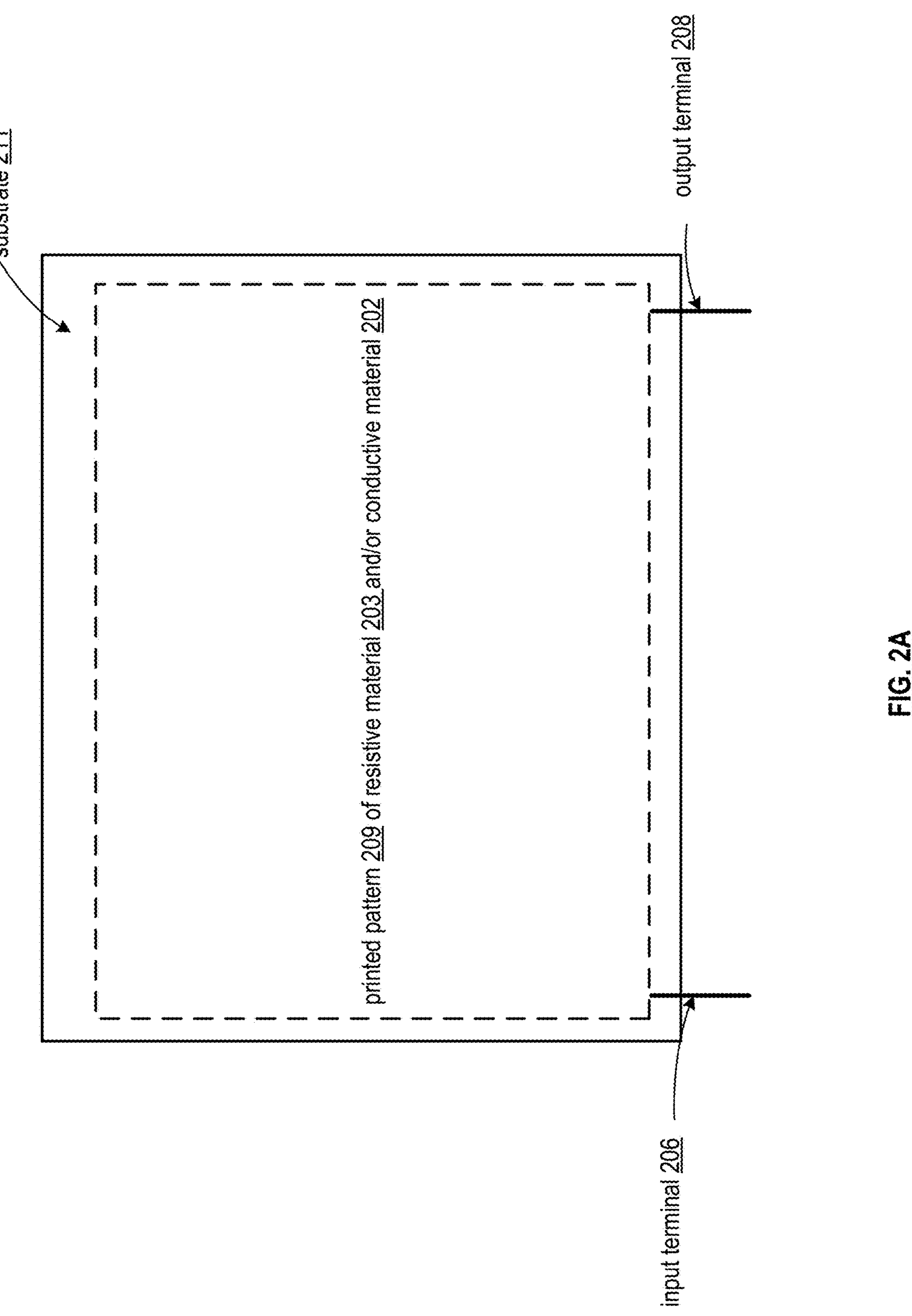
Figure 2B:
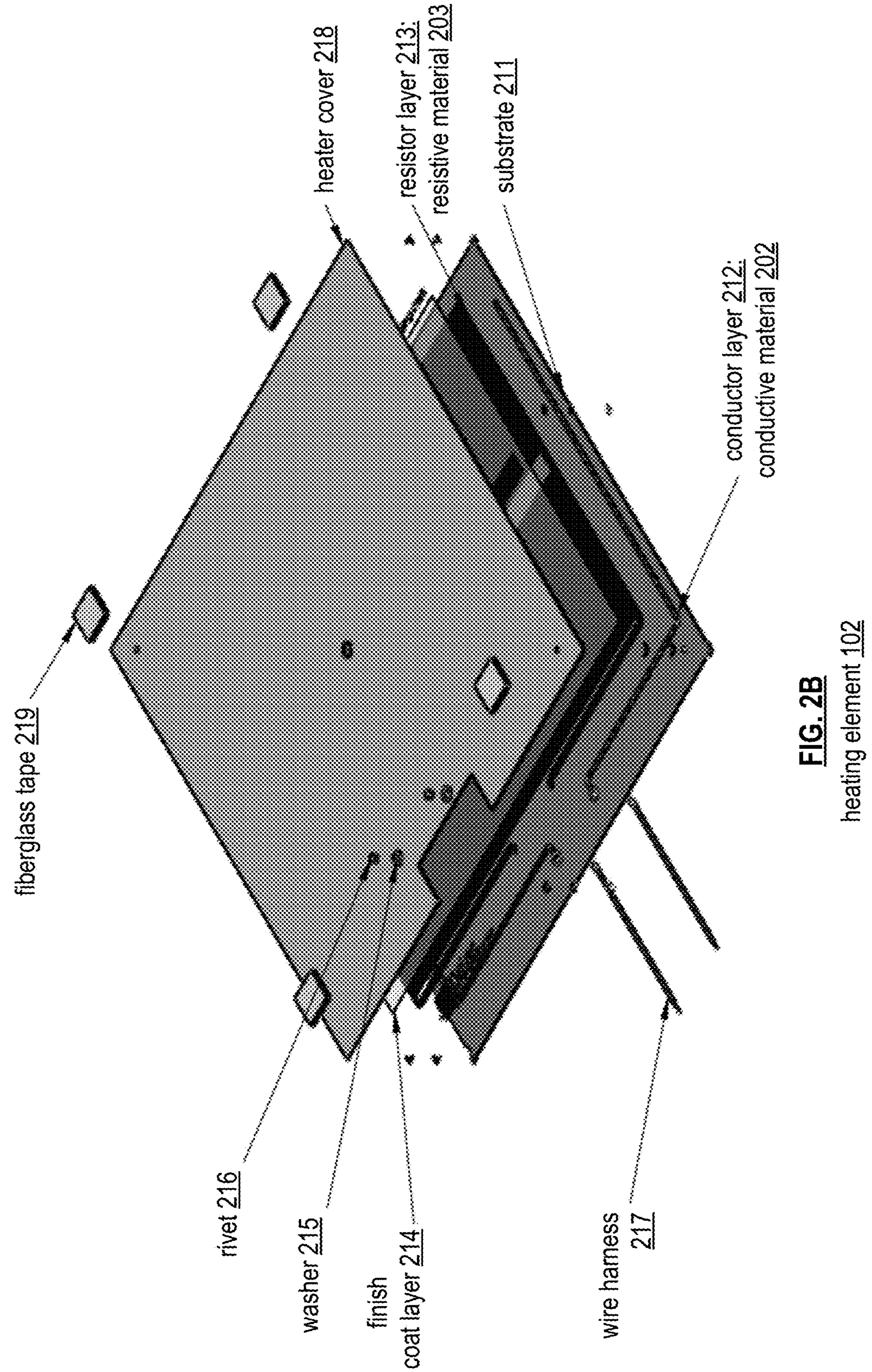

FIGS. 2A and 2B present example embodiments of heating element 102. Some or all features and/or functionality of the heating element 102 of FIGS. 2A and/or 2B can be utilized to implement the heating element 102 of FIG. 1 and/or any other embodiment of heating element 102 described herein.

In some embodiments, at least one heating element 102 of furnishing unit 110 can be implemented as a resistive heating element. For example, this resistive heating element is formed by printing a resistive material 203 onto a substrate 211. The resistive material 203 can be implemented as a heating-capable thick- or thin-film resistive material onto a substrate. In one example, a graphite- or graphene-based paste is printed onto a mica or like substrate. Other suitable thick- or thin-film materials having resistive heating capability are known such as those disclosed in U.S. Pat. No. 6,037,572 which is incorporated herein by reference.

In some embodiments, the substrate is comprised of 0.5 mm thick low smoke mica. The substrate can be implemented via any other thickness and/or other material.

As illustrated in FIG. 2A, such a resistive material 203 can be printed upon substrate 211 in accordance with a printed pattern 209. In one implementation, the film of resistive material is printed as a grid of fine lines. The lines can be printed as parallel lines, as a single meandering maze-like line, as a generally square or generally circular pattern, or the like. The deposited film material can have uniform or variable thickness with line widths and line spacing also being uniform or variable. The resistive material can be of uniform composition throughout or different regions of the deposited film can have different composition; for example, to provide relatively low and high resistivity regions. In one implementation, differences in resistivity of different parts of a thick- or thin-film heating element are used to direct applied current as required to establish a particular heating pattern. For example, an outer zone of a heating area is heated to a higher temperature than an inner central zone. Such an arrangement is adapted for chair backs where the spine marks a position of higher pressure compared to other parts of the sitter's back. Similarly, for a chair seat where the buttocks have higher pressure areas than surrounding areas. In one implementation, local thermostats are used to switch in and switch out parts of the pattern as limit temperatures are reached.

In various embodiments of the furnishing unit 110, the material of the resistive heating element, whether a film or a discrete wire or filament, has a positive temperature coefficient and so experiences an increase in electrical resistance when its temperature is raised. Depending on desired heating characteristics, in an alternative embodiment, the material has a linear or negative temperature coefficient.

In some embodiments of the furnishing unit 110, an associated film of conducting material can also be printed as a grid of input and output conducting material lines to connect the resistive lines to input and output terminals, and can thus be included in the printed pattern 209 as illustrated in FIG. 2A. If the heating element is a meandering resistive element, whether embodied as a wire or deposited film, an input terminal is electrically connected to one end of the element and an output terminal is electrically connected to the other end of the element. In an implementation specifically for a pattern of separate resistive lines, a conducting strip is printed to be integral with input ends of resistive element lines and another conducting strip is printed to be integral with output ends of resistive element lines. In one implementation, the conducting layer is overprinted on the resistive layer and connections between respective resistive and conducting lines are made vertically. Input and output conductive strips can be connected to input and output terminals 206 and 208, respectively, of a standard or tailored power receptacle or, via an electrical lead, to a plug.

In some embodiments of the furnishing unit 110, printing of resistive and conductive leads of printed pattern 209 can be by any of screen printing, ink drop printing, etc., tailored to the film material being used and the substrate to which the print material is being applied. For added integrity deposited conducting and resistive lines can be baked. The input and output terminals are in one implementation riveted to the adjacent rigid substrate.

FIG. 2B illustrates an example embodiment of heating element 102. Heating element 102 can be implemented via a plurality of layers that include substrate 211; a resistive layer 213 of resistive material 203, for example, printed upon the substrate 211 in the printed pattern 209 as discussed in conjunction with FIG. 2A; and/or a conductor layer 212 of conductive material 202, for example, printed upon the substrate 211 in the printed pattern 209 as discussed in conjunction with FIG. 2A.

As illustrated in FIG. 2B, the plurality of layers can further include a finish coat layer 214 and/or a heater cover 218. As illustrated in FIG. 2B, the heating element 102 can further include one or more washers 215, one or more rivets 216, one or more segments of fiberglass tape 219, and/or other fastenings or materials facilitating attaching of the layers to each other and/or to the furnishing unit. As illustrated in FIG. 2B, the heating element 102 can further include wire harness 217, for example, implementing the input terminal 206 and output terminal 208 of FIG. 2A.

In some embodiments, the heating element 102 is configured to operate at 120 volts and/or 250 Watts, or under different voltage and/or power specifications.

In some embodiments of the furnishing unit 110, the heating element is mated to a surface part of an article of heating-capable furniture. In one implementation, the article is a piece of stock construction material such as wood, metal, ceramic, glass, fiberglass, carbon, MDF board, clay, Formica™, Corian™, Solid surface, laminates, Glass fiber reinforced—plastic, gypsum, concrete, or the like for use in the manufacture of an article of heating-capable furniture. In an alternative implementation, the article is a surface part of the finished article itself, such as a piece of furniture, a vehicle, a boat, a floor, a pool or the like, with the resistive heating material and input and output conductors printed, coated or otherwise applied directly to the surface part itself and with a protective layer applied over the heating element.

In some embodiments of the furnishing unit 110, an intermediate layer of thermal transfer material is located on the heating 'side' between the heating element and an overlying substrate. The transfer material can be made flowable during manufacturing to enable adaptation to low level surface formations or roughness in either or both of the heating element and the substrate. The transfer material can have high thermal conductivity to minimize heat lost during transfer from the heating element to the substrate. As an alternativel to a flowable material, the transfer layer can be made pliable both to adapt to surface irregularities of a substrate and heating element and to adapt to the overall curvature of a substrate such as a chair part. In one implementation, the thermal transfer layer is itself deposited, as by vapor deposition or other suitable deposition method, or printed, as by screen printing, or other suitable printing method, directly onto the surface of the thick or thin film heating layer. In some embodiments, the thermal transfer layer is implemented as finish coat layer 214 of FIG. 2B and/or the overlying substrate is implemented as the heater cover 218.

In some embodiments of the furnishing unit 110, an intermediate thermally insulating layer is located on the non-heating 'side' between the heating element and an underlying substrate. The insulating material can act as a heat shield to minimize heat loss from the back or non-heating side of piece of furniture such as a chair and can be supplemented by a reflecting layer of material to reflect heat back the heating side. The heat shield can also prevent generated heat from inadvertently and/or undesirably heating another person or item in the locality of furniture that is being deliberately heated.

In some embodiments of the furnishing unit 110, a robust resistive heating element is formed as a winding resistive heating wire or filament. In an implementation, the wire or filament is contained within a facing or housing material such as silicone rubber. The silicone rubber acts to protect the element from outside conditions; also, to provide flexibility allowing the heating element to be bent around an article to be heated; and particularly in the case of use of facing material, to act to concentrate the projection of generated heat towards the object being heated while acting as a shield to limit heat from being directed away from the object being heated. The housed heating element can, in one embodiment, be secured to an underlying body by anchors such as screw-mounted brackets.

In various embodiments of the furnishing unit 110, the heating element, as supplemented by any heat transfer layer and/or insulating layer has an acrylic or Solid surface covering to render the structure resistant to deterioration from weather effects, such as a thermoformed acrylic or solid surface covering, a planar acrylic or solid surface covering, or other covering.

In various embodiments of the furnishing unit 110, dielectric material such as an epoxy is coated on a surface of a base material such as stock building material or an article of furniture. A resistive heating element such as any of a winding resistive wire, a lattice of resistive wires, or a printed lattice of resistive lines is then laid over or applied to the dielectric layer and a second layer of dielectric such as epoxy covers the resistive element. The stock material so produced is used to construct an item such as furniture, vehicles, boats, floors, pools, etc. As an alternative to a flowable epoxy, the heating element is sandwiched between layers of Corian™, Solid surface or like laminar material.

In another embodiment, the furniture material may be impregnated with Nano Carbon of Nano Graphene particles at appropriate concentrations and distributions so as to generate tortuosity, leading to heating of the entire material when energized. This is particularly applicable to composite materials such as cement, concrete, bio polymers, plastics, sintered stones, glass fiber reinforced Gypsum (GFRG) and the like.

In various embodiments of the furnishing unit 110, a sheet of substrate material bearing a heating element is embedded inside a cast material such as concrete. In one implementation, the embedded structure is first encased in an inert material to protect it from reaction with damaging chemicals used or produced in the course of the casting process. In another embodiment, heating elements are embedded in an injection molded material such as plastics.

In various embodiments of the furnishing unit 110, an item such as a chair is 3D printed and/or additive manufactured. At an intermediate stage in the course of printing, heating element material is put in place on, or applied to, the partially printed item. The printing process is then continued so that the heating elements are embedded in the completed printed item. In one implementation, the heating element is deposited as a thick film resistive layer. In another implementation, wires, filaments, or rods of resistive material are placed on the surface of the partially printed object or are placed within containing housings forming part of the partial print. In a further implementation, both conductive and resistive elements are formed in the partial print so as to provide elements of a heating circuit. In a variation, the heating element itself is printed into the object during the printing process by switching from the flowable base material, such as a plastic, to a flowable resistive metal component, switching back to base material, etc., until the resistive metal heating element is completed. Conducting leads to the heating element can optionally be also printed 'on the fly'.

In various embodiments of the furnishing unit 110, a heat storage medium such as a clay brick, or ceramic or feolite is lodged into stock manufacturing material, or into an article of furniture at a position adjacent a resistive heating element. In use, the heat storage medium is heated up during a heat storage cycle. At other times, even if there is no active heating of the heat storage medium, the previously heated medium releases its stored heat to warm a sitter or like user of the article of furniture. In one implementation, the heat storage medium is embedded in a 3D printed and/or or additive manufactured article of furniture during manufacture together with the associated heating element. In another implementation, the heat storage medium is added as part of the 3D material to be printed. Alternatively or in addition, a heat spreader medium, such as a piece or sheet of aluminum or other material, may be used to extend the heating coverage beyond the specific location of the heating element. In another implementation, the heating element comprises a mix of chemicals that exothermically react when electric current is passed through the mix, with the chemical returning to their initial state upon cooling when current flow ceases.

In various embodiments of the furnishing unit 110, a phase change material (PCM), such as an organic or salt hydrate PCM, is lodged into stock manufacturing material, or into an article of furniture at a position adjacent a resistive heating element. In use, the PCM is heated up during a heating cycle to precipitate a first direction phase change and then is allowed to cool to precipitate a reverse direction phase change. Controlled power is applied to the heating element in a cycle that releases latent heat from the PCM to warm a sitter in a warming period and absorbs latent heat in a cooling period either deliberately to cool a sitter or like user or to cool the article of furniture when no warming effect is required. In one implementation, the PCM is embedded in a 3D printed and/or additive manufactured article of furniture during manufacture together with the associated heating element. In another implementation, the PCM is added as part of the material, such as a 3D material and/or additive manufacturing material, to be printed, additive manufactured, and/or produced via another deposition process.

In various embodiments of the furnishing unit 110, particularly in the case of 3D printing of a heating-capable article of furniture, in one implementation, optical fibers, optical sources and related control devices are embedded in the 3D printed and/or or additive manufactured object during manufacture. In use optical circuits and effects therefrom are used to indicate, for example, active heating level and/or current temperature. In one example, optical display technology is used in the structure of a heating-capable chair or like item so that it glows in response to the item changing temperature. In a related implementation, the item glows with a shade that depends on the actual temperature of the item or part of it.

Figure 3A:
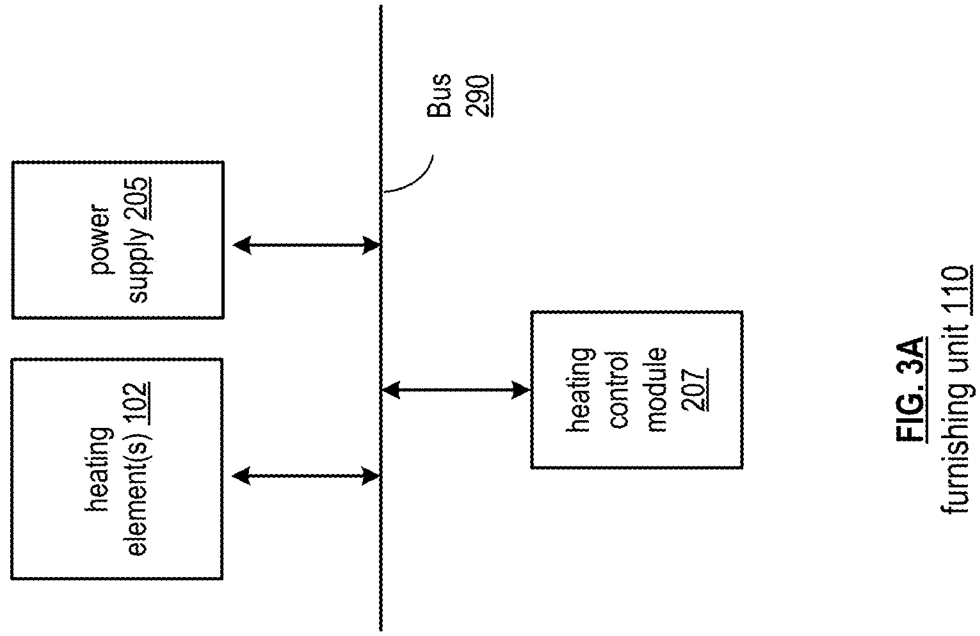
FIG. 3H illustrates a set of example visual indications for a set of heating states displayed by furnishing unit based on progressive button interaction in accordance with various embodiments.
FIG. 3I is a schematic block diagram of an example embodiment of a PCB element of a furnishing unit in accordance with various embodiments.

FIG. 3A presents a schematic block diagram of an embodiment of furnishing unit 110. A bus 290 of furnishing unit 110, such as at least one wired and/or wireless connection, can facilitate powering of at least one heating element 102 of the furnishing unit 110 via a power supply 205, optionally based on control data generated by a heating control module 207. Some or all features and/or functionality of the furnishing unit 110 of FIG. 3A can implement the furnishing unit 110 of FIG. 1 and/or any other embodiment of furnishing unit 110 described herein.

A furnishing unit 110 can include at least one heating element 102, which can be integrated into one or more portions of the furnishing unit as illustrated in FIG. 1, for example, to heat different parts of a person's body and/or otherwise supply heating in corresponding locations.

The furnishing unit 110 can further include a heating control module 207. The heating control module 207 can generate control data corresponding to configuration of the furnishing unit 110. This control data can cause the furnishing unit 110 to turn on and/or off, to supply heat at one of a set of multiple heating levels, and/or to otherwise change state of and/or configure functionality of the heating 105 delivered via furnishing unit 110.

In some embodiments, the heating control module 207 can include and/or can communicate with at least one user input device. In such embodiments, the control data can correspond to and/or be based on user input to the user input device, where a user configures the functionality of the heating 105 delivered via furnishing unit 110 via interaction with the user input device. The heating control module 207 can generate the control data via at least one processing module, at least one memory module, corresponding circuitry, at least one communications interface, at least one user input device, and/or other means.

In some embodiments, a user input device implementing heating control module 207 includes at least one switch, knob, button, lever, touchscreen displaying a graphical user interface, and/or other user input device. The user input device can be integrated within and/or in proximity to the furnishing unit, and can be actuated and/or toggled by a user in proximity to the furnishing unit. An example embodiment of a heating control module 207 of furnishing unit 110 implemented to include a button is illustrated in FIGS. 3D-3H.

In some embodiments, a user input device separate from furnishing unit 110 communicates with heating control module 207 to facilitate transmission of user input data, where heating control module 207 includes a communication interface. For example, the user input device is implemented as a remote control device for the furnishing unit 110 that transmits an IR signal or other short range wireless communication signal for receipt by the communication interface to facilitate generation of and/or receipt of control data configuring the heating 105 by furnishing unit 110. As another example, the user input device is implemented as a smart phone or other personal device of the user that executes application data corresponding to the furnishing unit that causes the user input device to display a graphical user interface for interaction by the user to enable the user to configure the heating 105 by furnishing unit 110. The smart phone or other personal device can communicate with the furnishing unit 110 via a Bluetooth connection, Wi-Fi connection, local area network connection, or other wired and/or wireless communication medium.

In some embodiments, the heating control module 207 can automatically generate control data without user intervention, for example, based on sensor input and/or received communications indicating environmental changes to which the heating 105 should adapt. For example, the furnishing unit 110 can further include at least one light sensor, temperature sensor, humidity sensor, pressure sensor, audio sensor, occupancy sensor, weather sensor, timer or clock, geolocation sensor, or other sensor utilized to determine changes in state data that causes the heating control module 207 to automatically change and/or otherwise configure the heating 105. For example, presence of a user can be detected via a pressure sensor, occupancy sensor, Wi-Fi connection with a device of the user, Bluetooth connection with a device of the user, radio frequency or other signal received from and/or detected as being transmitted by a device of the user, LIDAR proximity detection, or other means of detecting presence of a user in proximity. When presence is detected the heating elements 102 can turn on automatically based on detection of a person occupying the seat and/or otherwise being in proximity to the furnishing unit. As another example, the temperature sensor and/or other weather sensors can detect weather data that is processed by heating control module 207 to facilitate changing the heating level outputting by heating element 102 based on the outdoor temperature, or other weather elements such as wind or precipitation, changing.

In some embodiments, some or all of this state data processed by heating control module 207 can be received via a wired and/or wireless connection with the Internet and/or other communication network, for example, via a Wi-Fi connection and/or other network connection. For example, current weather data, reservation data for an establishment that includes the furnishing unit indicating reservation of the chair, and/or other data can be transmitted to the furnishing unit 110 via this network connection to cause the chair to determine to turn on and/or of, or configure the level of heating 105 by heating elements 102 based on determining corresponding temperature or other weather conditions, use by a user and/or particular person with particular preferences, or other information.

In some embodiments, furnishing units 110 generate and/or transmit data to other furnishing units 110 for processing, where heating control module 207 optionally utilizes data received from other furnishing units 110 to generate control data or otherwise configure heating 105 by heating element 102. Embodiments of a communication network of furnishing units is discussed in further detail in conjunction with FIGS. 4D-4H.

The heating elements 105 can be operable to supply heating based on being powered via a power supply 205. For example, the power supply 205 facilitates delivery of current that renders resistive heating elements of heating elements 105 to produce heat. In some embodiments, a power receptacle is mounted at a suitable position on the item to be heated, for example, underneath a chair seat. The power supply 205 can optionally further power the heating control module 207 and/or other electrical components of furnishing unit 110. Power supply can be implemented to supply AC or DC power, and can be implemented via a standard outlet connection, a battery, or other power supply. In some embodiments, the power supply is implemented via a step-down transformer and/or other transformer.

In various embodiments of the furnishing unit 110, as an alternative to a mechanical plug and receptacle arrangement, a power transfer unit includes input and output members that are attached to each other through an easy-release mechanism. In one embodiment, the easy-release mechanism eliminates conventional male to female connectors by using a combination of friction and/or magnetism to hold one member to the other. The level of friction and/or magnetic attraction are set sufficiently high so as to avoid light collisions from disconnecting the power transfer members from one other, while supporting safety by enabling disconnection if tension within the lead exceeds a pre-set safety level. The power system can use standard 120 volts or may, through transformer circuitry mounted on the chair or at another near location, enable use of lower voltage, especially if warranted or mandated for safety and/or certification reasons. Engagement of the power transfer members, whether of standard or dedicated design, can be such that upon deliberate or accidental disengagement of members at the power transfer unit, an associated electrical lead is spring-returned to a storage position. This can reduce the chance of accident or damage occurring in the event that a chair is inadvertently moved past the limit position set by the extension lead tethering.

In some embodiments, as an alternative to Mains power supply, a battery or battery pack may be used to connect to the furniture and provide system power. In an embodiment circuitry can be applied to render an individual piece of furniture adaptable to either this form of power or Mains Alternating current. This can use a custom or standard connector, and/or can include an external adapter in one or both modes of operation.

Figure 3B:
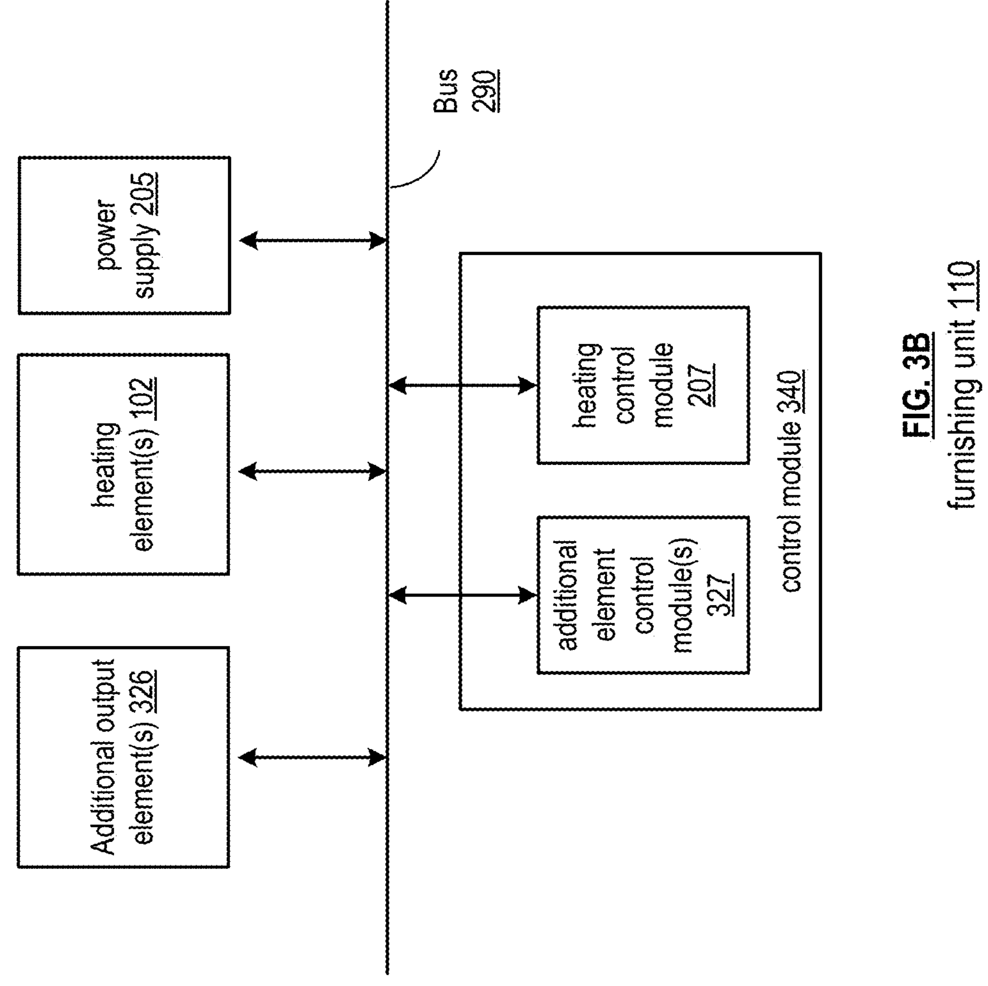

FIG. 3B illustrates an embodiment of furnishing unit 110 that further includes and/or is in proximity to at least one additional electrically-powered output element 326. Some or all features and/or functionality of FIG. 3B can implement the furnishing unit 110 of FIG. 3A, of FIG. 1, and/or any other embodiment of furnishing unit 110 described herein.

Power supply 205 of a given furnishing unit 110 can be utilized to not only power heating element 102, but to further power at least one ancillary device at or near the location of the article of furniture implementing furnishing unit 110. In particular, the heating power to an article of furniture such as a chair can offers the opportunity to implement electrically powered ancillary devices at or near the location of the article of furniture. In some embodiments, additional electrically-powered output elements 326 can share the same power supply 205 with heating element 102 through a step-down transformer, or another transformer.

Some or all additional electrically-powered output elements 326 can be controlled via corresponding additional element control modules 327. For example, a control module 340 is implemented to control heating via heating element 102 as well as configuration of other electrically-powered output elements 326, where these different elements are controlled separately or in tandem. For example the control module 340 can be operable to generate control data that causes: distributing and/or modulating of power delivered to both the heating element 102 as well as various additional electrically-powered output elements 326; turning the heating element 102 and/or additional electrically-powered output elements on and/or off over time; changing the level of output or other configuration of the heating element 102 and/or additional electrically-powered output elements 326 at various times; or other configuration of the heating element 102 and/or additional electrically-powered output elements. For example, the control module 207 can collect and/or generate control data based on status information of the power supply 205, the heating element 102, and/or least one additional electrically-powered output element 326 the furniture, such as on/off, warming up, at temp, fault, and the like.

The control module 340 can be implemented via at least one processing module, at least one memory module that stores operational instructions executed by the at least one processing module causing the processing module to generate control data and/or configure functionality of the heating element 102 and/or additional electrically-powered output elements. The control module 340 can be implemented via other circuitry that enables control of the power delivered and/or configuration of heating element 102 and/or one or more additional electrically-powered output elements 326.

In some embodiments, at least one additional electrically-powered output element 326 can be implemented as at least one wireless charging station. The wireless charging station can be implemented via a charging coil mounted on the article of furniture to be heated and shares the same supply, such as via a step-down transformer, as the heating element. The charging coil can be, for example, suitably mounted or located under a chair seat, on or under the arm of a chair, near the lip of a table, etc., to permit charging of cell phones, laptop computers and similar devices.

Alternatively or in addition, at least one additional electrically-powered output element 326 can be implemented as at least one lighting device, such as at least one light emitting diode (LED), at least one embedded optical fiber, optical sources, a display device displaying graphical image data, and/or related control devices. For example, LED lighting of the ground below the furniture to be heated, can share the same supply (e.g. through a step-down transformer) as the heating element and/or can be controlled by its own control circuitry, can share the use of the heater control circuitry, and/or can be controlled via control module 340. As another example, LED backlighting of a translucent or transparent company Logo on the furniture to be heated, shares the same supply (e.g. through a step-down transformer) as the heating element and/or can be controlled by its own control circuitry, can share the use of the heater control circuitry, and/or can be controlled via control module 340.

In another implementation LED lighting of the ground below the furniture and/or LED backlighting of the translucent or transparent company logo on the furniture to be heated, shares the same supply (e.g. through a step-down transformer) as the heating element and may be controlled by its own control circuitry, share the use of the heater control circuitry, and/or can be controlled via control module 340. Control data generated by the control module 340 and/or other control circuitry can enable the various lighting to provide ambient effects, such as Breathing, pulsing, beating, changing color, changing intensity, flashing, and/or other LED effects. The lighting device can otherwise be implemented: to render the object visible in the dark for safety purposes; denote whether the furnishing unit is in use or available; to present corporate logos; to present a display which changes dynamically in response to music or other stimulus and/or which displays media data such as video data or gaming data, or other purposes.

In some embodiments, the control data can be generated to configure some or all of these various lighting effects, or other output, based on user configuration data generated by a user, such as data received via a user input device, accessed in a user account via the network, and/or otherwise determined as having been pre-set, selected in real time, and/or otherwise configured by a user, such as an owner of the furnishing unit 110, person running a corresponding establishment that contains the furnishing unit 110, or person sitting in and/or in proximity to the furnishing unit 110.

In some embodiments, the control data can be generated to automatically configure these lighting effects based on other state data, and/or based on control data received from another source. For example, the lighting can change to indicate whether or not the furnishing unit is currently occupied by and/or reserved by a user, where the lighting turns on or off, changes color, intensity, flashing pattern, or other effect based on detecting whether the furnishing unit is currently occupied. This can include processing data collected via pressure sensors or occupancy sensors of the furnishing unit to determine whether a user is sitting in and/or in proximity to the furnishing unit. This can alternatively or additionally include processing data received via a communication channel indicating the user has reserved and/or paid for use of the furnishing unit 110, for example, via a server system of a corresponding establishment. This can alternatively or additionally include processing data received via a credit card reader or other financial transaction terminal integrated within the furnishing unit 110 indicating the user has paid for use of the furnishing unit 110.

As another example, in some embodiments, the control module 340 or other control circuitry accepts musical input, and processes the music to exercise variations in the lighting effects. The musical input can be received via at least one microphone of the furnishing unit and/or a known characteristics of a currently played playlist such as a tempo of the music can be accessed, received, or otherwise determined. This music can be played via speakers at a corresponding establishment and/or indoor or outdoor space.

Alternatively or addition, this music can optionally be played via speakers integrated within the furnishing unit 110 as an additional electrically-powered output element 326 sharing the power supply 205. For example, a user such as an owner of the establishment or person currently sitting in and/or in proximity to the furniture can select a song, playlist, radio station, configure volume, or otherwise configure the music via a user input device. Alternatively or in addition, in furnishing unit 110 can receive the music via a communication interface, such as music from a radio station, and/or retrieved via the Internet or other network. Alternatively or in addition, in furnishing unit 110 can access the music to be played in its own memory and/or in other memory accessible by processing resources of furnishing unit 110.

In some embodiments, the control data can be generated to automatically configure these lighting effects based on automatically adapting to other chairs and/or furniture sharing the same circuit and/or in a same physical area to provide effects expanding across the group. These group-based effects can be automatically selected and/or can be tuned by or pre-selected for the owner and/or current user of the furniture. Embodiments illustrating a group of furniture that communicate are discussed in further detail in conjunction with FIGS. 4D-4H.

Figure 3C:
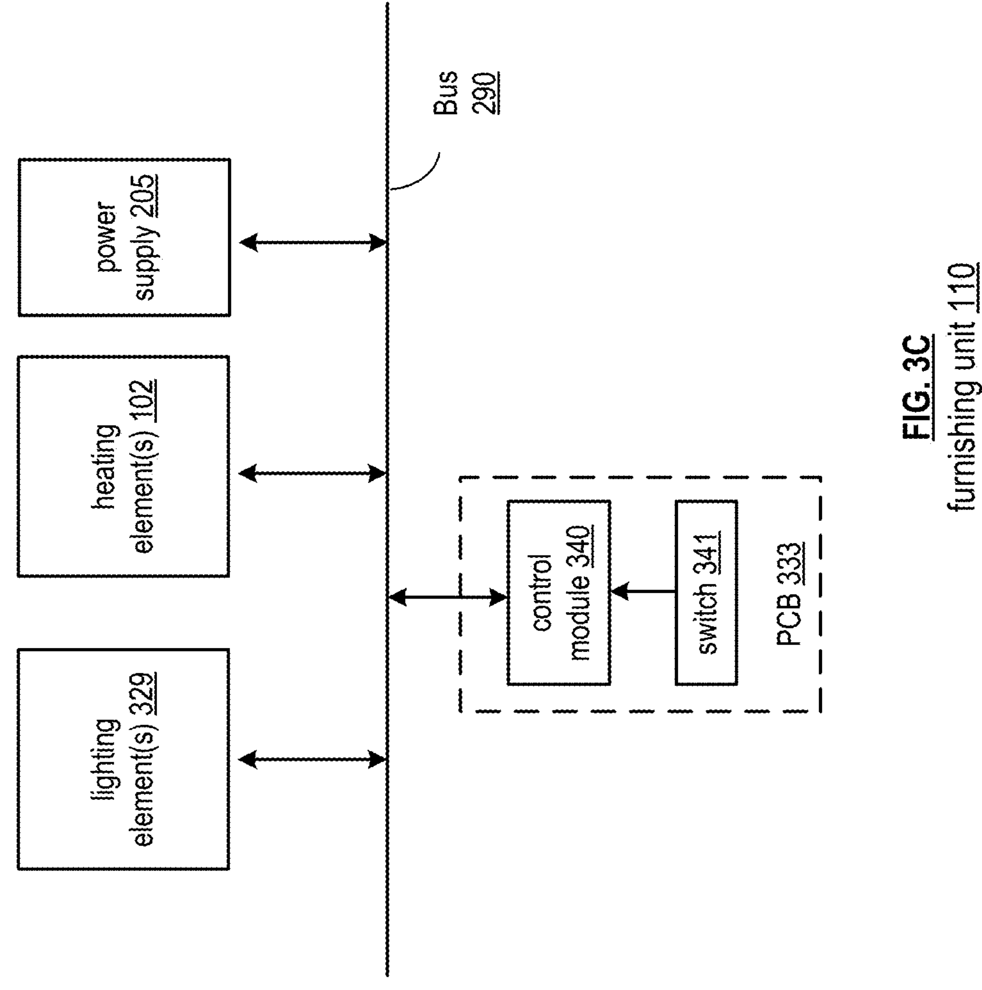

FIG. 3C illustrates an example embodiment of a furnishing unit 110 that implements functionality of control module 340 via a printed circuit board (PCB) 333 that includes a switch 341. Some or all features and/or functionality of the furnishing unit 110 of FIG. 3C can be utilized to implement the furnishing unit 110 of FIG. 3A, of FIG. 1, and/or any other embodiment of the furnishing unit 110 described herein.

In some embodiments, manual toggling of, and/or other interaction with, switch 341 via user input can cause corresponding changes to the power delivered to one or more heating elements 102 to turn heating elements on and off, and/or to change the intensity of heating 105 generated by heating elements 102 between multiple different heating levels. Manual toggling of, and/or other interaction with, switch 341 via user input can further cause corresponding changes to the power delivered to one or more lighting elements 329, such as turning of lighting elements 329 on and/or off and/or otherwise configuring the state of one or more lighting elements 329.

FIGS. 3D-3H illustrate an example embodiment of a PCB element 133 of a furnishing unit 110. Some or all features and/or functionality of the PCB element 133 of FIGS. 3D-3H can be integrated within the furnishing unit 110 of FIG. 1 and/or any other embodiment of furnishing unit 110 described herein. Some or all features and/or functionality of the PCB element 133 of FIGS. 3D-3H can be utilized to implement some or all of the control module 340 of FIGS. 3B and/or 3C and/or some or all of the heating control module 207 of FIGS. 3A and/or 3B.

Figures 3D, 3E:
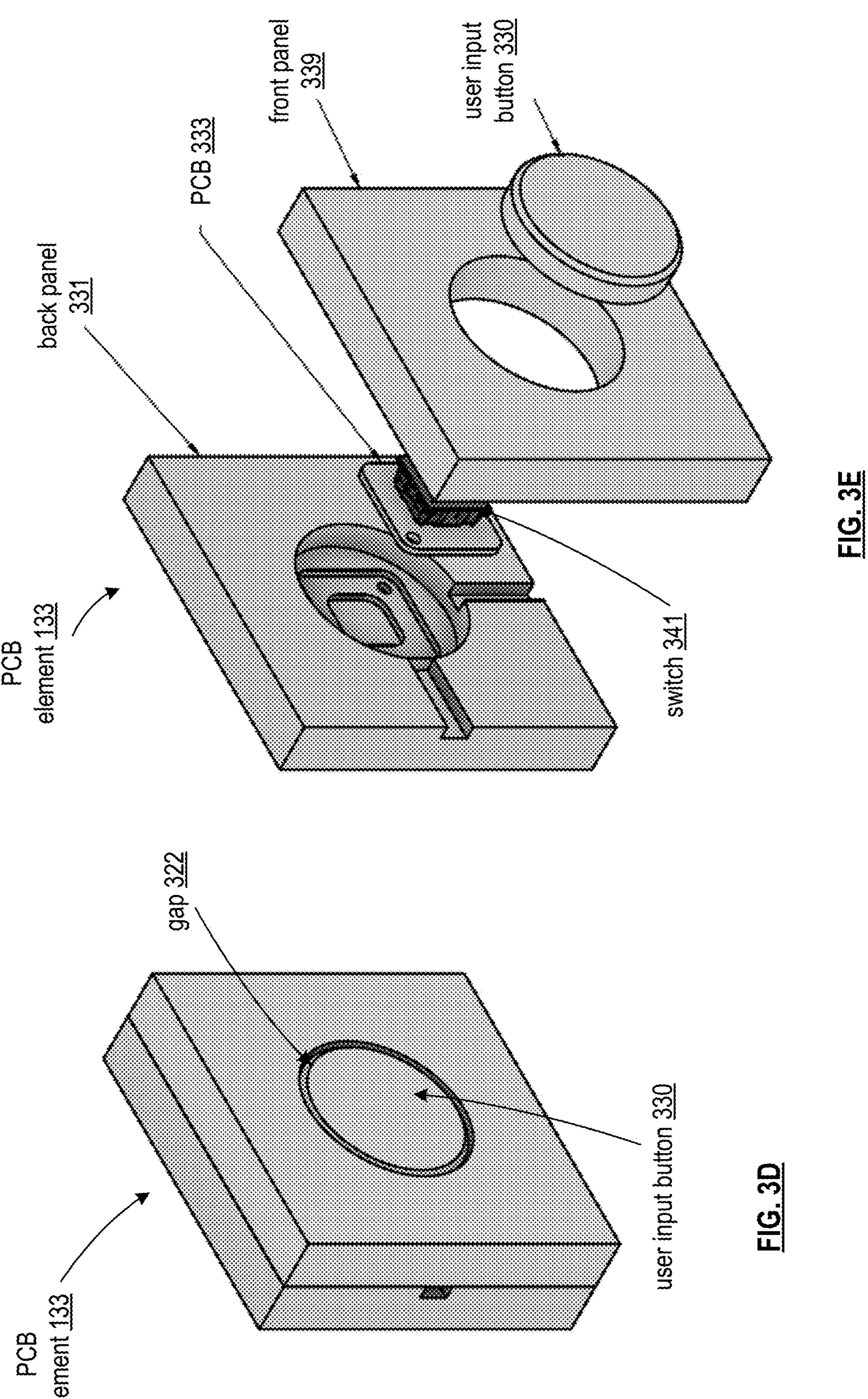

As illustrated in FIG. 3D, PCB element 133 can include a user input button 330, which can have a gap 322 with paneling of the PCB element 133. The user input button 330 can physically move when pressed, for example, having strong tactile feedback for the user when pressing user input button 330. The PCB element 133 can be permanently attached to a portion of furnishing unit 110, can be removable from furnishing unit 110, and/or can have a wired and/or wireless connection with heating control module 207 of furnishing unit 110.

As illustrated in FIG. 3E, the PCB element 133 can encase a PCB 333 that includes a switch 341 between a front panel 339 and back panel 331. The user input button can be exposed, and when pressed, can actuate switch 341.

Figure 3G:
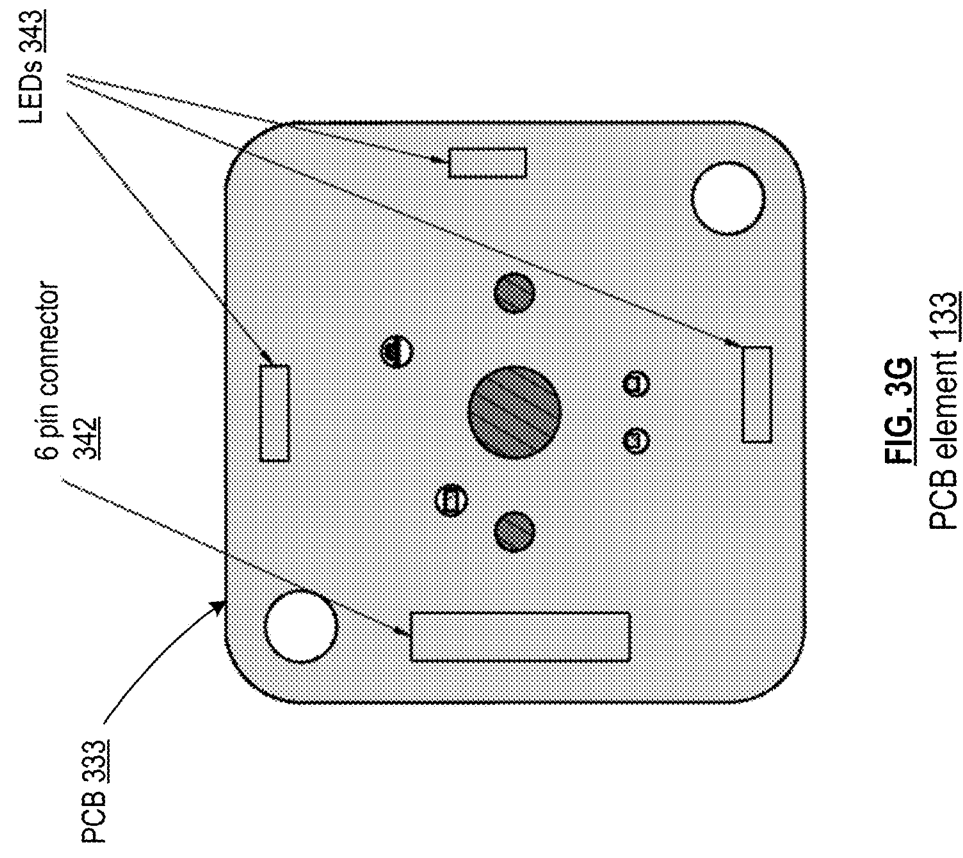
Figure 3F:
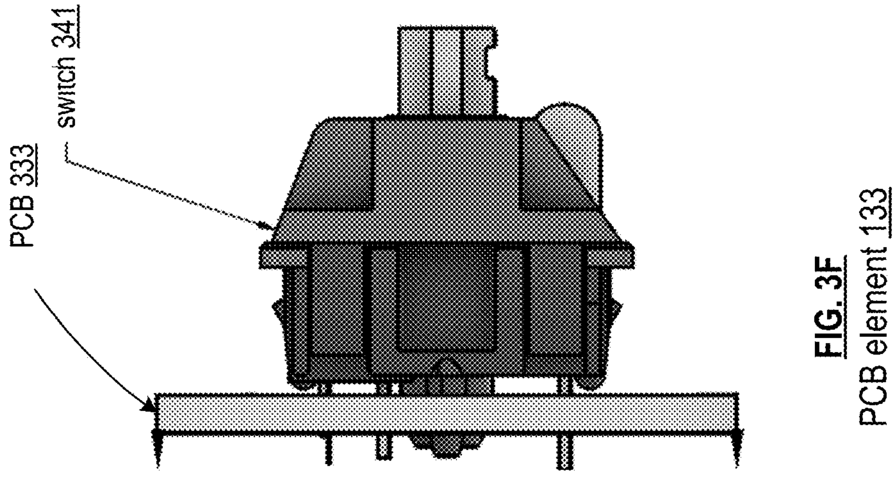

FIG. 3F presents a side view of an embodiment of PCB 333 that includes switch 341. FIG. 3G illustrates a back view of this embodiment of PCB 333. The PCB 333 can further include a 6 pin connector 342 and/or multiple LEDs 343, such as three LEDs 343 arranged at 0, 90, and 180 degree increments as illustrated in FIG. 3G. The LEDs can be outward facing and/or otherwise configured such that, when lit, the light emitted is visible through gap 322 of FIG. 3D. The LEDS 343 can be individually controllable via PCB 333, where different individual LEDs 343 can be toggled between on and off states individually.

The PCB 333 can be implemented to cycle through four possible configurations of lighting of LEDs 343, which can correspond to different states of heating element 102. The different configurations of lighting of LEDs 343 can be visible via gap 322 to indicate the current state of heating element 102.

Figure 3H:
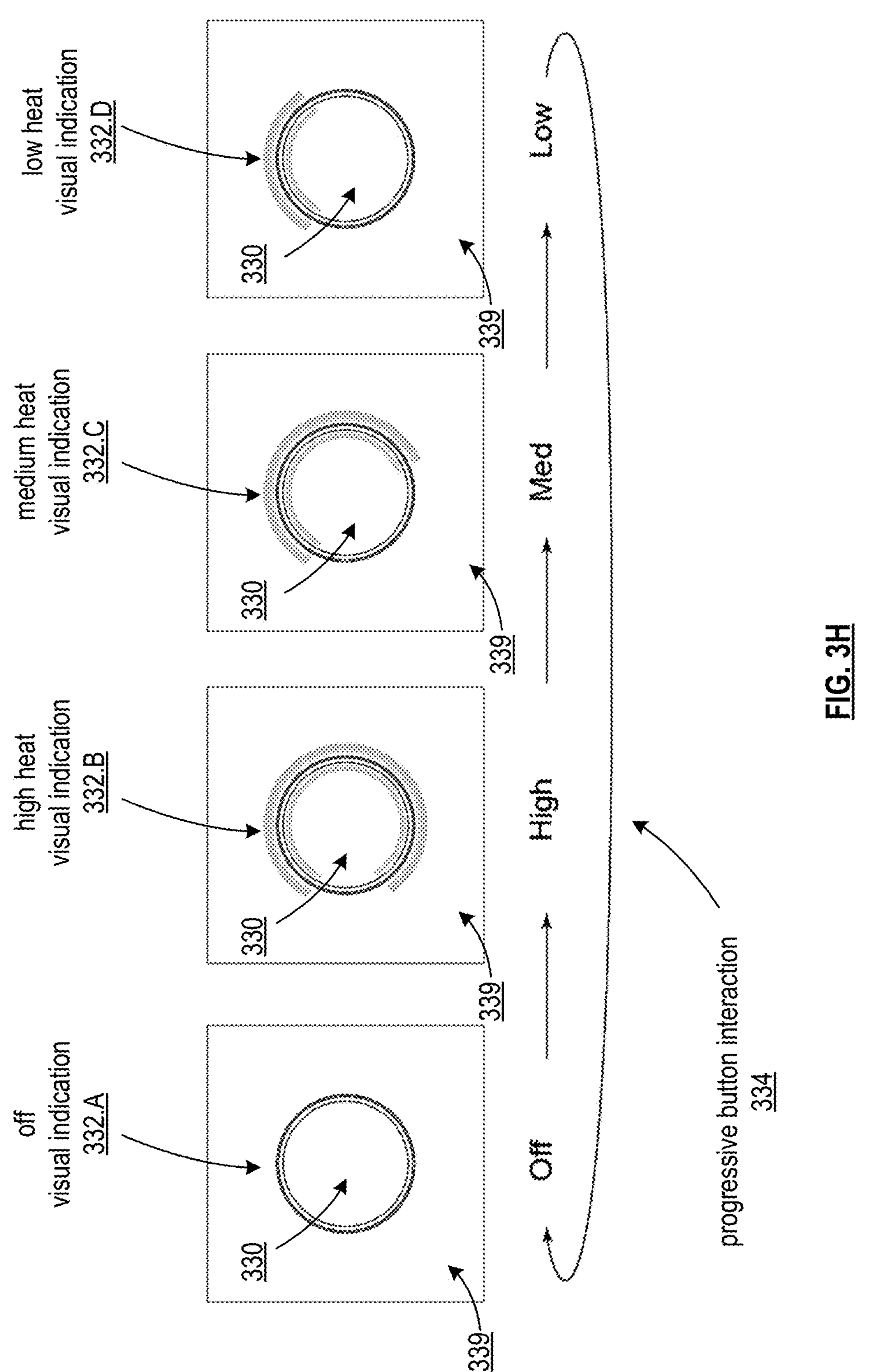

FIG. 3H illustrates an example embodiment of a set of four visual indications 332.A-332.D denoted via different configurations of lighting of LEDs 343 of PCB element 133 that can denote four corresponding different states of heating element 102: off; high; medium; and low. As progressive button interaction 334 is induced via user pressing of the button 330, the furnishing unit 110 can cycle between these four states. Progression into a next state via activation of switch 341 of PCB 133 can automatically induce changing of lighting of one or more LEDs 343 as well as adjusting of power delivered to heating element 102 via corresponding circuitry PCB 133.

For example, no power is delivered to heating element 102 when in the off state; a first power level is delivered to heating element 102 when in the high heat state; a second power level lower than the first power level is delivered to heating element 102 when in the medium heat state; and/or a third power level lower than the second power level is delivered to heating element 102 when in the low heat state. An intensity and/or temperature of heating 105 by heating element 102 when in the high state can be greater than that when in the medium state, and/or an intensity and/or temperature of heating 105 by heating element 102 when in the medium state can be greater than that when in the low state. The high, medium, and low state can all correspond to non-zero power delivered to heating element 102, where some level of heating 105 is emitted, and can thus all be considered different on states. The off state can correspond to no power delivered to heating element 102, where no heating 105 is emitted.

Off visual indication 332.A can correspond to no lighting via gap 322 due to no LEDs 343 being lit while the heating element 102 is off. High heat visual indication 332.B can correspond to lighting via gap 332 surrounding approximately and/or greater than 270 degrees, due to all three LEDs 343 being lit when the heating element 102 is operating under the high heat state, for example, where all LEDs 343 change from being unlit to being lit when entering the high heat state from the off state. Medium heat visual indication 332.C can correspond to lighting via gap 332 surrounding approximately and/or greater than 180 degrees, due to exactly two LEDs 343 being lit when the heating element 102 is operating under the medium heat state, such as the top LED 343 and the side LED 343 of FIG. 3G being lit and the bottom LED 343 changing from being lit to unlit when entering the medium heat state from the high heat state. Low heat visual indication 332.D can correspond to lighting via gap 332 surrounding approximately and/or greater than 90 degrees, due to exactly one LED 343 being lit when the heating element 102 is operating under the low heat state, such as the top LED 343 of FIG. 3G being lit and the side LED 343 changing from being lit to unlit when entering the low heat state from the medium heat state. When reentering the off state, the top LED 343 of FIG. 3G can change from being lit to being unlit to render all three LEDs unlit.

Figure 3I:
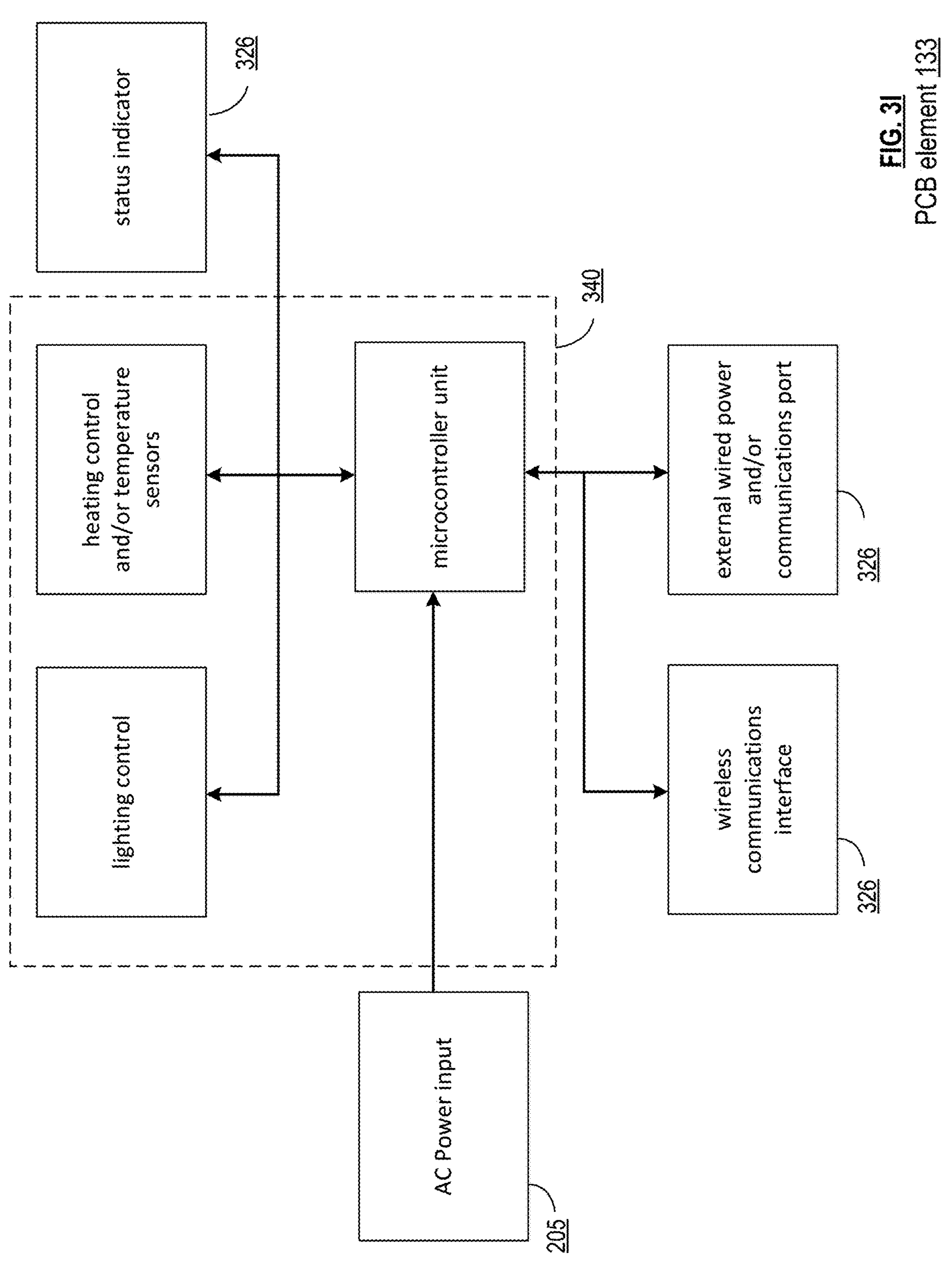

FIG. 3I is a schematic block diagram of an example embodiment of a PCB element 133. Some or all features and/or functionality of the schematic block diagram FIG. 3I can implement the schematic block diagrams of some or all of FIGS. 3A-3C. Some or all features and/or functionality of the PCB element 133 of FIG. 3I can implement the PCB element 133 of some or all of FIGS. 3D-3H.

The PCB element 133 can include a microcontroller unit powered via AC power input. The AC power input can be implemented as power supply 205. The microcontroller unit can be implemented as an ESP32, an NXP i.MX series, and/or any other microcontroller unit. The microcontroller unit can implement some or all of control module 207, can include at least one processor and/or memory, and/or can be operable to perform and/or control some or all functionality of furnishing units 110 described herein.

The PCB element 133 can include and/or be coupled to at least one external wired power and/or communications port. For example, the external wired power and/or communications port is implemented via an external USB plug, such as an external USB type-C plug for 3 amp charging and/or connectivity. Some or all functionality of microcontroller unit can be configured via communications received via the external wired power and/or communications port, such as via a mobile device connected to the external wired power and/or communications port via a wired connection, such as via a USB cable. The microcontroller unit can facilitate sending of power to charge mobile devices or other devices to the external wired power and/or communications port via the wired connection. The microcontroller unit can facilitate sending of communications, such as status data, sensing data, wireless connectivity data, and/or other data, to mobile devices or other devices connected to the external wired power and/or communications port via the wired connection. The at least one external wired power and/or communications port can optionally be implemented an additional output element 326 and/or can implement functionality of control module 340. In some embodiments, wireless charging capabilities and/or wireless connectivity capabilities can be implemented instead of or in addition to an external wired power and/or communications port The PCB element 133 can include and/or be coupled to at least one wireless communications interface. For example, the at least one wireless communications interface is implemented to facilitate Wi-Fi communications and/or Bluetooth communications. Some or all functionality of microcontroller unit can be configured via communications received via the wireless communications interface, such as via a mobile device and/or server system paired to and/or communicating with the corresponding furnishing unit via a wireless connection, such as a Bluetooth connection, Wi-Fi connection, and/or other wireless communications medium. The microcontroller unit can facilitate sending of communications, such as status data, sensing data, wireless connectivity data, and/or other data, to mobile devices, server systems, and/or other devices communicating with the furnishing unit via the wireless communications. The at least one wireless communications interface can optionally be implemented an additional output element 326 and/or can implement functionality of control module 340.

The PCB element 133 can include and/or be coupled to heating control and/or temperature sensors, which can include controllers such as heat control module 207 and/or heating elements implemented as and/or coupled to heating elements 102. For example, the heating control and/controls heating of one or more heating elements 102. This can include controlling the intensity by which one or more heating elements 102 is heating at a given time. This can alternatively or additionally include controlling which subset of a set of multiple heating elements 102 are activated at a given time (e.g. seat back heating element vs. seat bottom heating element can be independently turned on or off, or have heating intensity tuned, at a given time to enable heating of buttocks only, back only, or both). In such embodiments, the heating control can implement heating zone control to control heating within different locations of the furnishing unit (e.g. at least one seat back zone, a left seat arm zone, a right seat arm zone, at least one seat bottom zone, etc.). In some embodiments, the heating zone control controls heating of 6 zones, or another number of zones. The heating control can control lighting elements based on control data generated by and/or received from the microcontroller unit of FIG. 3I. Some or all of the heating control can be implemented via the microcontroller unit of FIG. 3I. The heating control of FIG. 3I can implement some or all of control module 340.

Configuration of heating intensity in one or more zones can be based on one or more temperature sensors, for example, where greater heating intensity and/or heating in a greater number of zones is automatically facilitated via the heating control when lower temperatures are measured via temperature sensors, and/or where lower heating intensity heating in a smaller number of zones is automatically facilitated via the heating control sensors when higher temperatures are measured via temperature sensors.

The PCB element 133 can include and/or be coupled to lighting control, which can include controllers such as one or more additional element control modules 327 and/or output elements 326 implemented as and/or coupled to lighting elements 329. For example, the lighting control controls LED light zones, a subset of a plurality of LEDs or other lighting devices illuminated at a given time, a color emitted by one or more lighting devices illuminated at a given time, intensity of light emitted by one or more LEDs of other lighting devices illuminated art a given time, and/or other powering of and/or configuration of any type of lighting devices 329 described herein. The lighting control can control lighting elements based on control data generated by and/or received from the microcontroller unit of FIG. 3I. Some or all of the lighting control can be implemented via the microcontroller unit of FIG. 3I. The lighting control of FIG. 3I can implement some or all of control module 340.

The PCB element 133 can include and/or be coupled to a status indicator, which can be implemented as an output element 326. For example, the status indicator is optionally implemented as a lighting element controlled by the lighting control, such as the set of LEDs of FIGS. 3G and 3H denoting current heating intensity. The status indicator can be implemented via another type of lighting element, at least one speaker emitting audio output, a communication interface transmitting status data to a server system and/or proximal mobile device, and/or other output element 326 that visually, audibly, or otherwise communicates status of the heating elements and/or other status of the corresponding furnishing unit.

FIGS. 4A-4H illustrate embodiments where multiple furnishing units 110 are in a same furnishing unit group. A group of furnishing units can be located in a same establishment and/or physical boundary, be owned by a same person or entity, can be in physical proximity, and/or can otherwise be grouped together. In particular, a group of furnishing units can be operable to draw power from a shared power source via power connections with each other and/or can be operable transmit and receive communications signals via communications connections with each other. Some or all features and/or functionality of FIGS. 4A-4H can implement the furnishing unit 110 of FIG. 1, and/or any other embodiment of furnishing unit 110 described herein.

In some embodiments, an extension lead can be taken from the chair to a central power unit for servicing a group of heating-capable chairs or one of a group of chairs can have a central heating power source for heating the other chairs in the group. For example, as illustrated in FIG. 4A, multiple furnishing units 110 are powered via individual wired and/or wireless power connections 220 drawing power from a same power source 410. In some embodiments, one piece of furniture has both an input and output connection enabling furniture to be "Daisy chained" one to another. For example, as illustrated in FIG. 4B, multiple furnishing units 110 are powered by power source 410 via indirect connections, where some furnishing units 110 receive power directly from other furnishing units 110 via power connections 220 drawing power supplied by these other furnishing units 110, and where some furnishing units 110 further output power to other furnishing units via power connections 220 with these other furnishing units. Alternatively or in addition, one piece of furniture may act as a central connection hub for several others. For example, as illustrated in FIG. 4C, multiple furnishing units 110 are powered by a particular furnishing unit 110, who receives power from power source 410 or optionally from another furnishing unit 110, receiving power via a daisy chain in a same or similar fashion as illustrated in FIG. 4B. In either example, a first furnishing unit 110 supplying power to a second furnishing unit via a power connection 220 can be considered the power source of the second furnishing unit.

As a particular example, a first furnishing unit 110 implemented as a table acts as a central connection hub for one or more furnishing units 110 implemented as chairs connected to it via power connections 220 drawing power from the table. This table can optionally be operable to provide its own heating via its own heating elements, or is simply implemented to facilitate the connection with other furnishings, such as chairs, to enable powering of these other furnishings in delivering heating 105.

Power received directly or indirectly by a furnishing unit 110 from a power source 410 via a power connection 220 with power source 410 and/or via a power connection 220 with another furnishing unit 110 can be utilized to implement the power supply 205 of FIGS. 3A and/or 3B, and/or can otherwise be utilized to power its heating element 102 and/or one or more of its additional output elements 326.

Power connections 220 between furnishing units can be implemented via lead tethering connected to power transfer devices of the furnishing units. The power transfer devices of some or all furnishing units in the group of furnishing units can be implemented via easy-release mechanisms as discussed previously to help ensure that damage is not imposed in the event that a chair is inadvertently moved past the limit position set by the lead tethering between the furnishing units.

Furnishing units 110 can optionally be similarly connected via wireless and/or wired communications connections 221 to facilitate transfer of data between different furnishing units 110. For example, as illustrated in FIG. 4D, furnishing units can include a communications interface enabling receipt of data generated and/or relayed by other furnishing units 110, and/or enabling transmission of data for processing by and/or relaying by other furnishing units 110. Two or more furnishing units 110 of a same group of furnishing units can thus communicate various data. This data can include status data, control data, or other data.

The wireless and/or wired communications connections 221 can be implemented via circuitry, physical wiring, Bluetooth connections, Wi-Fi connections, short range wireless communications, the Internet, a local area network, and/or any other wired and/or wireless communications connections. While communications connections 221 are illustrated as one to one bidirectional connections, data can alternatively or additionally be broadcast and/or transmitted via a common network for receipt and/or retrieval by other furnishing units.

As illustrated in FIGS. 4E and 4F, alternatively or in addition to communicating with one another, a group of furnishing units can be collectively controlled via a group control module 440, which can be implemented in a same or similar fashion as control module 207, 327, and/or 340. The group control module 440 can generate control data that is transmitted to and processed by control modules and/or other processing resources of individual furnishing units to configure heating and/or other functionality of the furnishing unit. The control data generated and sent to different furnishing units 110 via group control module 440 at a given time can be the same or different for different furnishing units 110 to enable same or different configuration of heating, lighting, power consumption, power transfer, or other configurable functionality of furnishing units.

In some embodiments, the control data is broadcast and/or sent individually via distinct communications connections 221 to different furnishing units as illustrated in FIG. 4E. Alternatively or in addition, control data can be relayed via one or more furnishing units 110 in a daisy chain fashion as illustrated in FIG. 4F. Other network configurations of furnishing units connected via communications connections 221 can be implemented in other embodiments. The configuration of communications connections 221 connecting a group of furnishing units can be the same or different from a configuration of power connections 220 of the group of furnishing units, for example, where communications connections 221 and power connections 220 are implemented as wired connections, wired together to reduce the network of wiring required to facilitate transfer of power and data between furnishing units.

In some embodiments, the control data received by a given furnishing unit can be relayed to other furnishing units 110 with which a given furnishing unit has communication connections 221, for example, where same control data is applied by all furnishing units. Alternatively or in addition, different control data can be designated for different furnishing units, where a given furnishing unit can receive, from a prior furnishing unit or from the group control module 440 directly, control data designated for itself, as well as a set of additional control data designated for one or more other furnishing units 110. The given furnishing unit can process its own control data for configuring of its own heating element and/or other output elements, can further route set of additional control data to appropriate furnishing units to ensure all control data ultimately receive and process their individual control data in generating their heating and/or other functionality accordingly.

The group control module 440 can be implemented via a computing device, remote control device, smart phone, and/or any other circuitry and/or processing module operable to generate and transmit control data. In some embodiments, the group control module 440 can optionally generate control data based on user input received by the group control module 440, for example, where a user configures various functionality of the group of furnishing units.

The group control module 440 can optionally be implemented as a control module 340 of a given furnishing unit, where one or more furnishing units of a given furnishing unit group can be operable to control other furnishing units.

In some embodiments, instead of or in addition to one furnishing unit controlling other furnishing units, some or all furnishing units can automatically adjust their own heating, communication, power draw, and/or other output via their own control module, adaptively based on changes detected for the group of furnishing units as a whole. For example, furnishing units can be dynamically self-healing, and/or the removal or addition of a furnishing to a group, such as group powered via a common power supply, can automatically cause each furnishing unit in the group to adjust its power draw or other output, and/or can cause the entire group as a whole to continue operating within the set parameters. In such embodiments, a set of independently operating control modules 340 of a set of multiple furnishing units within a given group of furnishing units can collectively implement the group control module 440 and/or can otherwise collectively facilitate any functionality of the group control module 440 described herein, independently and/or in conjunction, with or without coordination with other furnishing units in the group. In some embodiments, control module 340 of some or all furnishing units in a given group of furnishing units can be operable to detect removal or addition of a furnishing units to the group, can be operable to detect changes in power input, and/or can be operable to detect other changes. Such changes detected by individual furnishing units can cause different furnishing units to each automatically adjust their own heating, communications, power consumption, and/or other functionality accordingly, independent from and/or without communication with other furnishing units, and/or based on control data or other communications and/or coordination with other furnishing units.

In some embodiments, the group control module 440 can generate control data automatically based on received, measured, and/or otherwise determined state data. For example, metrics such as power consumption, power availability, health of a given furnishing unit, received user input data, measured weather data, occupancy of the furnishing unit, and/or other information can be measured by given furnishing unit as discussed previously. This information can be sent by the given furnishing unit as data via communications connections 221 to other furnishing units for use in generating their own control data for controlling their own heating elements 102 and/or additional output elements 326. Alternatively or in addition, this information can be processed by the control module of the given furnishing unit to generate control data that by the given furnishing unit as data via communications connections 221 to other furnishing units for use in controlling their own heating elements 102 and/or additional output elements 326, alternatively or in addition to use by the given furnishing unit to control its own heating element 102 and/or additional output elements 326. Alternatively or in addition, this information can be sent by the given furnishing unit as data via communications connections 221 to the group control module 440, where the group control module 440 receives such metrics from some or all furnishing units in the group of furnishing unit it controls or otherwise communicates with, and/or where the group control module 440 collectively processes these metrics received from some or all furnishing units in the group of furnishing units to generate the control data sent to some or all furnishing units 110 as illustrated in FIGS. 4B and/or 4C.

In some embodiments, communications connections 221 are implemented to enable furnishing units 110 to communicate and intelligently modulate power consumption ensuring a system of connected furniture maintains a power draw below the threshold which would trigger overloading of a standard 15 A or 20 A electrical circuit while optimizing heat up time and heat maintenance. For example, the group control module 440, for example, implemented as a control module of a given furnishing unit, can be operable to automatically generate control data based on measured data of this given furnishing unit indicating levels of power input and/or power consumption, and/or based on measured data from other furnishing units indicating their own levels of power input and/or power consumption. The control data generated by heating control module 207 and/or group control module 440 can cause the power consumption by the furnishing unit 110 to modulate accordingly in powering heating elements 105. Alternatively or in addition, the control data generated by heating control module 207 of a given furnishing unit causes the power output by this furnishing unit 110 that is sent to one or other furnishing units 110 to modulate accordingly, where this power output is used by these other furnishing units 110 to power their own heating elements 105 based on receiving power from the given furnishing unit 110 as illustrated in FIGS. 4B and/or 4C. Alternatively or in addition, the control data generated by heating control module 207 of a given furnishing unit is transmitted to one or more other furnishing units to cause these other furnishing units to modulate their own power consumption and/or otherwise adapt their power usage.

In some embodiments, the group control module 440 can generate control data utilized to add and/or remove furnishing units 110 from a given group of furnishing units connected via a network of communication connections 221, power connections 220, and/or other group. For example, a user can interact with an interactive user interface to scan for nearby furnishing units, connect to furnishing units, add furnishing units to groups, remove furnishing units to groups, configure functionality of furnishing units, or other control.

FIGS. 4G and 4H illustrate example configurations of a group of furnishing units that are connected via various wired power connections 220 and/or wired communication connections 221. The group of furnishing units 110 can include different types of seating units 112.A, 112.B, 112.C, and/or 112.D.

For example, seating units 112.A can be implemented as couches that include one or more heating elements configured to provide heating and/or other output described herein to one or more people seated on the couch. One or more proximal seating units 112.A can form a lounge seating area as illustrated in FIG. 4H, for example, within a given indoor or outdoor establishment.

As another example, seating units 112.B can be implemented as chairs that include one or more heating elements configured to provide heating and/or other output described herein to a single person seated in the chair. One or more proximal seating units 112.B can be positioned around one or more corresponding tables to form a dining seating area as illustrated in FIG. 4H, and/or can be otherwise dispersed within the given indoor or outdoor establishment.

As another example, seating units 112.C can be implemented as bar stools, high chairs, or other seating that include one or more heating elements configured to provide heating and/or other output described herein to a single person seated in bar stool, high chair, or other seating. One or more proximal seating units 112.C can be positioned along a bar to form a bar seating area as illustrated in FIG. 4H, for example, within the given indoor or outdoor establishment. The seating units 112.C can be the same or different type of furniture as seating units 112.B.

As another example, seating units 112.D can be implemented as banquettes or other seating that include one or more heating elements configured to provide heating and/or other output described herein to one or more people seated in the banquette. One or more proximal seating units 112.D can be positioned along a bar and/or one or more tables to form a banquette seating area as illustrated in FIG. 4H, for example, within the given indoor or outdoor establishment. The seating units 112.D can be the same or different type of furniture as seating units 112.A.

In some embodiments, one or more tables and/or a bar around which various seating units 112 are positioned can be implemented as additional furnishing units 110 in the group of furnishing units. For example, the one or more tables and/or bar of FIGS. 4G and/or 4H can be connected to one or more seating units 112 via power connections 220 to deliver power to various proximal seating units 112. Alternatively or in addition, the one or more tables and/or bar of FIGS. 4G and/or 4H can be connected to one or more seating units 112 via communication connections 221 to route communications between and/or control various proximal seating units 112. Alternatively or in addition, the one or more tables and/or bar of FIGS. 4G and/or 4H can have their own heating elements 102 and/or additional output elements 326 that are powered via power connections 220 and that deliver heating and/or other output such as lighting, music, or other functionality accordingly.

In various embodiments of the furnishing unit 110. items with heating capability of the sort described previously are in communication with each other and with a controller so that, for example, heating-capable chairs, foot rests, table surfaces and under-the-table units communicate to establish and automatically adjust heat in a shared zone. In an embodiment of the invention, Wi-Fi control is used in conjunction with resistive heating elements and controller mounted at or incorporated in a heating-capable item to provide remote control and energy tracking of the item. In some embodiments, Wi-Fi control can be established by linking to the chair through a local Wi-Fi system. In absence of a local Wi-Fi system, the furnishing unit may become a Wi-Fi Access point for the purpose of enabling local control. In some embodiments, direct control is exercised through a local controller by a person located at and using the item. In some embodiments, the furnishing unit powers at least one communications interface implementing the Wi-Fi access point, Bluetooth communications, or other wireless local communications capability.

In various embodiments of the furnishing unit 110, the items of furniture include floor materials such as heating-capable patio stones. These may be individually heating-controlled using an accompanying or integrated smart interconnecting system. In one implementation, power moves from stone to stone making them an expandable system to suit any sized space and currently prevailing human foot traffic. Such stones, bricks or like externally deployed materials are, in one implementation, manufactured with a heating element mated to a reverse side or are manufactured with a phase change substance in an internal cavity, the phase change material providing heat when powered electrically.

In some embodiments, the stones, bricks, or other materials integrated within the floor, walls, ceiling, or other structural and/or infrastructure elements can further be operable to facilitate way finding and/or user following. For example, these stones, bricks, or other materials can be implemented via some or all functionality of furnishing units 110 discussed herein. These stones, bricks, or other materials can be implemented to include at least one sensor, for example, to detect presence of a user near these materials and/or stepping upon these materials. These stones, bricks, or other materials can be implemented to include at least one lighting device, for example, to facilitate lighting of the corresponding material, for example, to aid user's in finding a path to other furnishing units and/or to provide other way finding. In some embodiments, these stones, bricks, or other materials automatically illuminate lighting devices in response to detecting a user stepping upon stones, bricks, or other materials and/or otherwise in proximity to these stones, bricks, or other materials. Alternatively or in addition, these stones, bricks, or other materials illuminate lighting devices along a predetermined and/or dynamically determined path, for example, to illuminate at least one path ahead of the user's detected location and/or ahead of the user's detected direction of motion and/or behind the user's detected location and/or behind the user's detected direction of motion. In such embodiments, the stones, bricks, or other materials along a path in accordance with the user's direction of motion and/or projected direction of travel can be illuminated and/or can adapt to changes in the user's direction of travel as they walk along the corresponding floor and/or corresponding path containing these elements. In some embodiments, a predetermined destination is determined based on navigation data, routing data and/or other destination data determined for the user, received from a mobile device or other device of the user via a wireless communication connection, generated automatically based on the user's destination, and/or accessed via a server system. In such embodiments, the stones, bricks, or other materials along a path from the user's current location to the predetermined destination in accordance with this navigation data, routing data and/or other destination data.

In various embodiments of the furnishing unit 110, a communications link terminates at a heating-capable item of furniture with a remote information resource such as a web-based weather channel being periodically accessed over the link. In response, heating is turned on, or off, or adjusted, for example, to compensate for ambient or forecast temperature and wind chill. As an alternative to periodic operation, a weather link furnishes storm indications and the heating circuit is turned on, for example, for a period of time linked to an expected snowfall. A local communication link can use Bluetooth, Bluetooth Low Energy, Wi-Fi, LTE-M, NFC or a similar communications protocol. In one implementation, a heating-capable chair or like item has a controller to energize the heating circuit on a periodic basis for melting snow or ice, for example, implemented via heating control module 207 of the chair.

In various embodiments of the furnishing unit 110, for a heating-capable item such as a chair connected to a communications link such as network 150 the internet, a QR or like code, and/or other visual identifier data mounted on or embedded in the chair or other item, allows a user to buy heating time. Such a chair is, in one implementation, for example, located in a public place, where heating funds can go to local coffers much as parking fees do.

In various embodiments of the furnishing unit 110, the heating circuit of a heating-capable item such as a chair is battery operated. In one battery implementation, the item has a solar rechargeable battery connected to a solar panel mounted in, on or near the item for optical exposure to ambient charging light.

In various embodiments of the furnishing unit 110, through an internet or like communication link to a heating-capable chair or like item, the heating control circuit is connected to a restaurant, bar, establishment, or other hospitality provider's point of sale (POS) system. A chair heating circuit can be activated when a customer sits down and de-activated when they leave, either triggered by the POS system when seating is assigned or by chair sensors detecting when a person sits in the chair or gets up. The system link is in one implementation used also to see what the customer purchased, how long they were at the table, and what temperature the chair is set to if there is local adjustment capability. This can enable data analytics to see which meals are most commonly eaten, how long people sit while eating a specific meal or drinking a specific drink, which table placement gets the most seating traffic, etc., for example, to generate some or all of learned characteristics data for users, products, furnishing units, and/or establishments as described herein.

FIGS. 5A and 5B illustrate an example embodiment of various parts of a furnishing unit 110 implemented as a seating unit 110. FIG. 5A illustrates a deconstructed back view of an embodiment of seating unit 110, while FIG. 5B illustrates a constructed back view of this embodiment of seating unit 110 with all members attached in their final configuration. Some or all features and/or functionality of the seating unit 112 of FIGS. 5A and/or 5B can implement the furnishing unit 110 of FIG. 1 and/or any other embodiment of furnishing unit 110 described herein. For example, the back view presented in FIGS. 5A and 5B can correspond to the back view of the furnishing unit 110 with front view depicted in FIG. 1.

The seating unit 112 can be configured for use outside, for example, on an outdoor patio in winter and/or other cold weather conditions. The seating unit 112 can be configured to be positioned with the feet of seat frame 124 upon a floor and/or ground.

The seating unit 112 can include a seat back 121 and a seat bottom 112. The seating unit 112 can be configured for a user to sit in the seating unit 112 with their buttocks upon a top side of the seat bottom 122 and their back against a front side of the seat back 121.

The seating unit 112 can include a seat frame 124 that supports the seat back 121 and seat bottom 122, for example, where the seat back 121 and seat bottom 122 are permanently and/or firmly attached to form a 98 degree angle or other angle.

The seating unit 112 can include a set of seat arms 123, upon which a user sitting in seating unit 112 can place their hands and/or arms. The seat arms can be attached to sides of the seat back, for example, within slotted inserts of the seat back 121.

In some embodiments, the seat back 121, seat bottom 122, seat arms 123, and/or seat frame 124 are comprised of a Corian™ material, or different material that is optionally weather proof, weather resistant, or otherwise suitable for outdoor use. In some embodiments, the seat back 121, seat bottom 122, seat arms 123, and/or seat frame 124 are 3D printed and/or additive manufactured as discussed previously.

The seat bottom 122 can include a drainage insert 132 operable to collect water, for example, from precipitation such as rain and/or snow that has since melted, which can be ideal in reducing wetness applied to a user when they seat themselves into the seating unit 112 after rain and/or snow when the seating unit 112 is located in an outdoor area. The drainage insert can be comprised of a molded plastic material or other material. The drainage insert can be permanent or removable.

A seat back heating element 102.A can be attached to the back side of seat back 121, opposite the front side against which a user's back rests against while sitting. Alternatively or in addition, a seat bottom heating element 102.B can be attached to the underside of seat bottom 122, opposite the top side upon which a user's buttocks rests while sitting. Seat back heating element 102.A and/or seat bottom heating element 102.B can be implemented as a heating pad, which can be implemented via some or all features and/or functionality as depicted in and discussed in conjunction with FIG. 2A and/or FIG. 2B. Seat back heating element 102.A and/or seat bottom heating element 102.B can be operable to deliver corresponding heating 105 through the seat back 121 and seat bottom 122, respectively, to provide corresponding warmth to the user's back and/or buttocks while seated in the seating unit 112.

A PCB element 133 can facilitate delivery of power to and/or control of seat back heating element 102.A and seat bottom heating element 102.B. The seat back heating element 102.A and seat bottom heating element 102.B can be implemented via some or all features and/or functionality of heating element 102 described herein. The PCB element 133 can be implemented via some or all features and/or functionality of PCB element 133 of FIGS. 3D-3H and/or can implement the heating control module 207, at least one additional element control module 327, control module 340, control module 440, and/or any other control module, processing resources, and/or circuitry of furnishing unit 110 described herein.

The seat back heating element 102.A and/or seat back heating element 102.B can be encased by a heating pad cover plate 134, for example, to protect users from exposed portions of the heating elements 102 and/or to insulate the heating elements 102. The PCB element 133 can remain exposed, for example, to facilitate user access to press and/or otherwise physically interact with user input button 330 or other user input module of the PCB element 133.

In various embodiments of the furnishing unit 110, parts of a heating-capable structure such as a chair are, through articulation or material flexibility, moved relative to one another and relative to the main body of the structure. In the case of a chair, such articulation or flexibility is between a body part of the chair and any of the chair seat, chair back, chair sides, chair arms, etc. Relative movement of chair parts is used to tailor heat transfer and distribution to people of different stature and physique. Tailored movement in another case permits the addition of more warmth to one part of a person's body—for example, a sitter's hands—that feel subjectively cold to the sitter.

FIGS. 6A-6D present top, front, side, and back views, respectively, of an example embodiments of seating unit 112. Some or all features of seating unit 112 of FIGS. 6A-6D can implement the seating unit 112 of FIGS. 5A and/or 5B, the furnishing unit of FIG. 1, and/or any other embodiment of furnishing unit described herein. The various dimensions of various aspects of seating unit 112 presented in FIGS. 6A-6D can correspond to inches, or another common unit.

As illustrated in FIGS. 6A-6D, the seating unit 112 can optionally include one or more etched logos 136. Some or all instances of etched logo 136 can optionally be implemented as a transparent and/or translucent logo that is backlit by an LED or other light as discussed previously. The etched logo 136 can be implemented as one or more letters and/or shapes etched into and/or attached to the surface of seating unit 112, and/or that are otherwise visible to users in proximity to the seating unit 112. Other embodiments of seating unit 112 can have logos 136 in different locations and/or can have no logo.

FIGS. 6E-6H present top, front, side, and side views, respectively, of an example embodiments of a seat frame 124 of a seating unit 112. Some or all features of seat frame 124 of FIGS. 6E-6H can implement the seat frame 124 of seating unit 112 of FIGS. 5A, 5B, and/or 6A-6D, a seat frame of furnishing unit of FIG. 1, and/or a seat frame of any other embodiment of furnishing unit described herein. The various dimensions of various aspects of seat frame 124 presented in FIGS. 6E-6H can correspond to inches, or another common unit, such as a same unit as dimensions presented in FIGS. 6A-6D. Other embodiments of seat frame 124 can have different shape, size, and/or dimensions. Some or all portions of the seat frame 124 can have a 24 mm thickness or other thickness.

FIGS. 6I-6L present three-dimensional front, top, side, and side views, respectively, of an example embodiments of a seat bottom 122 of a seating unit 112. Some or all features of seat bottom 122 of FIGS. 6I-6L can implement the seat bottom 122 of seating unit 112 of FIGS. 5A, 5B, and/or 6A-6D, a seat bottom of furnishing unit of FIG. 1, and/or a seat bottom of any other embodiment of furnishing unit described herein. The various dimensions of various aspects of seat bottom 122 presented in FIGS. 6I-6L can correspond to inches, or another common unit, such as a same unit as dimensions presented in FIGS. 6A-6D. Other embodiments of seat bottom 122 can have different shape, size, and/or dimensions. Some or all portions of the seat bottom 122 can have a 12 mm thickness or other thickness.

As illustrated in FIG. 6L, the seat bottom 122 can include a drainage insert cavity. The drainage insert cavity 137 can be configured to secure drainage insert 132 of FIG. 5A. Drainage insert 132 is optionally removable from drainage insert cavity 137 and has a solid bottom for emptying, or lines the drainage insert cavity 137 and is permanently inserted to allow flow of precipitation or other liquid through the drainage insert cavity 137 to the ground even when inserted.

FIGS. 6M-6P present top, side, front and three-dimensional front views, respectively, of an example embodiments of a seat back 121 of a seating unit 112. Some or all features of seat back 121 of FIGS. 6M-6P can implement the seat back 121 of seating unit 112 of FIGS. 5A, 5B, and/or 6A-6D, a seat back of furnishing unit of FIG. 1, and/or a seat back of any other embodiment of furnishing unit described herein. The various dimensions of various aspects of seat back 121 presented in FIGS. 6M-6P can correspond to inches, or another common unit, such as a same unit as dimensions presented in FIGS. 6A-6D. Other embodiments of seat back 121 can have different shape, size, and/or dimensions. Some or all portions of the seat back 121 can have a 12 mm thickness or other thickness.

As illustrated in FIG. 6O, the seat back 121 can include a pair of arm slots 138. Each arm slot 138 can be configured to secure a corresponding seat arm 123 of FIG. 5A.

FIGS. 6Q-6S present three-dimensional top, side, top views, respectively, of an example embodiments of a seat arm 123 of a seating unit 112. Some or all features of seat arm 123 of FIGS. 6Q-6S can implement the seat arm 123 of seating unit 112 of FIGS. 5A, 5B, and/or 6A-6D, a seat arm of furnishing unit of FIG. 1, and/or a seat arm 123 of any other embodiment of furnishing unit described herein. The various dimensions of various aspects of seat arm presented in FIGS. 6Q-6S can correspond to inches, or another common unit, such as a same unit as dimensions presented in FIGS. 6A-6D. Other embodiments of seat arm 123 can have different shape, size, and/or dimensions.

FIGS. 6T-6Y present three-dimensional front, three-dimensional back, top, front, back, and side views, respectively, of an example embodiments of a heating pad cover plate 134 of a seating unit 112. Some or all features of seat arm 123 of FIGS. 6Q-6S can implement the heating pad cover plate 134 of seating unit 112 of FIGS. 5A, 5B, and/or 6A-6D, a heating pad cover plate of furnishing unit of FIG. 1, and/or a heating pad cover plate of any other embodiment of furnishing unit described herein that is configured to cover one or more heating elements 102. The various dimensions of various aspects of heating pad cover plate 132 presented in FIGS. 6Q-6S can correspond to inches, or another common unit, such as a same unit as dimensions presented in FIGS. 6A-6D. Other embodiments of heating pad cover plate 132 can have different shape, size, and/or dimensions.

In various embodiments, a seating unit, such as a seating unit 112, a table, and/or any other type of furnishing unit 110 can include at least one heating element configured to deliver heating to a user in proximity to the seating unit, table, and/or other type of furnishing unit.

In various embodiments, the seating unit further includes a seat back and a seat bottom. The seat back can have a front side and a back side. The seat bottom can have a top side and an underside. The seating unit can further include at least one heating element configured to deliver heating to a user while seated in the seating unit when electrically powered. The seating unit can further include circuitry configured to facilitate delivery of power to the first heating element and the second heating element.

In various embodiments, the seating unit, table, or other type of furnishing unit includes a first heating element. The first heating element can be attached to the back side of the seat back, and configured to deliver first heating through the seat back to a user while seated in the seating unit when electrically powered. In various embodiments, the seating unit, seating unit, table, or other type of furnishing unit further includes a second heating element. The second heating element can be attached to the underside of the seat bottom, and/or can be configured to deliver second heating through the seat bottom to the user while seated in the seating unit when electrically powered. The seating unit, table, and/or other type of furnishing unit can further include circuitry configured to facilitate delivery of power to the first heating element and the second heating element.

In various embodiments, the first heating element and the second heating element each comprise a first film of resistive material deposited on a substrate. In various embodiments, the first film is deposited as a pattern of resistive lines. In various embodiments, the first heating element and the second heating element each further comprises a second film of conducting material deposited on the substrate, the second film deposited as a pattern of conducting lines electrically connected to the resistive lines.

In various embodiments, the seating unit, table, or other type of furnishing unit further comprises input and output terminals for transferring power to the first heating element and the second heating element, the input and output terminals connected to a power transfer unit mounted to the seating unit. In various embodiments the seating unit, table, or other type of furnishing unit further comprises a power lead configured to interconnect a power source and the power transfer unit. In various embodiments, wherein the power transfer unit is an easy release power transfer device having first and second parts held together in a normal state by at least one of: friction or magnetism.

In various embodiments, a second seating unit, or other type of furnishing unit, includes the power source. The power lead can interconnect the power source and the power transfer unit based on attaching to a second power lead of the second seating unit. The second seating unit, or other type of furnishing unit, can power at least one heating element of the second seating unit via the power source. In various embodiments, the seating unit or other type of furnishing unit further includes a second power lead supplying power to a third seating unit, where the third seating unit powers at least one heating element of the second seating unit via the power supplied by the seating unit via the second power lead.

In various embodiments, the circuitry causes the first heating element and the second heating element to change between a set of at least three heating states. In various embodiments, first heating state of the set of at least three heating states corresponds to delivering heating via a first intensity; a second heating state of the set of at least three heating states corresponds to delivering heating via a second intensity that is lower than the first intensity; and/or a third heating state of the set of at least three heating states corresponds to delivering no heating.

In various embodiments, the seating unit, table, or other type of furnishing unit further includes a user input button. A switch of the circuitry can be actuated based on pressing of a user input button attached to the seating unit, where actuation of the switch causes the first heating element and the second heating element to change between different ones of the set of at least three heating states in accordance with a cyclical ordering of the set of at least three heating states.

In various embodiments, the seating unit, table, or other type of furnishing unit further includes a communications interface, where control data received via the communications interface is processed via the circuitry to cause the first heating element and the second heating element to change between different ones of the set of at least three heating states.

In various embodiments, the first heating element is implemented as a first heating pad, and/or the second heating element is implemented as a second heating pad. The seating unit can further comprise a heating pad cover plate comprising a vertical covering component and a horizontal covering component. A first side of the first heating pad can be secured against the back side of the seat back, and/or a second side of the first heating pad opposite the first side of the first heating pad can be secured against an inner surface of the vertical covering component of the heating pad cover plate. A first side of the second heating pad can be secured against the underside of the seat bottom, and/or wherein a second side of the second heating pad opposite the first side of the second heating pad can be secured against an inner surface of the horizontal covering component of the heating pad cover plate.

In various embodiments, the vertical covering component and a horizontal covering component form a 98 degree angle, or another angle, at an edge of the heating pad cover plate connecting the vertical covering component and the horizontal covering component. In various embodiments, the first side of the first heating pad lies upon a first plane, the first side of the second heating pad lies upon a second plane, where the first plane is non-parallel with the second plane and/or meets the second plane at the 98 degree angle or other angle.

In various embodiments, the seating unit, table, or other type of furnishing unit further includes a removable drainage insert. The seating unit can be configured to be positioned upon a planar surface for seating by the user. The seat bottom can include a front end and a back end, wherein a front end of the seat bottom is a first distance from the planar surface when the seating unit rests upon the planar surface, where the back end of the seat bottom is a second distance from the planar surface when the seating unit is positioned upon the planar surface, and wherein the second distance is smaller than the first distance. The seat bottom can include a drainage insert cavity at the back end of the seat bottom. The removable drainage insert can be configured to be secured within the drainage insert cavity. In various embodiments, the removable drainage insert is further configured to collect precipitation landing upon the seat bottom based on flowing of the precipitation from the front end to the back end based on the second distance being smaller than the first distance. In various embodiments, precipitation collected within the removable drainage insert is configured to be emptied based on removal of the removable drainage insert.

In various embodiments, the seating unit, table, or other type of furnishing unit further includes at least one additional electrically powered element. In various embodiments, the at least one electrically powered element includes a first lighting element integrated within the seating unit behind a translucent logo upon a surface of the seating unit, wherein the first lighting element is configured to backlight the translucent logo; a second lighting element attached to an underside of the seat bottom, wherein the second lighting element is configured to illuminate a surface below the seating unit upon which the seating unit is positioned; a charging coil of a wireless changing station, wherein the charging coil is configured to charge a mobile device when resting upon a corresponding surface of the seating unit, and/or any other lighting, charging, and/or other output element.

In various embodiments, the at least one electrically powered element includes at least one communication interface that facilitates wireless connection with a mobile device enabling user configuration, via user interaction with a graphical user interface displayed via the mobile device, of at least one of: the at least one heating element, or at least one further additional electrically powered element. In some embodiments, the user configuration is enabled via accessing a preset user profile for the user, for example, received from the mobile device and/or from a server system associated with the furnishing unit. The at least one communication interface can transmit a signal identifying the furnishing unit and/or facilitating connection with a mobile device, for example, via a Bluetooth pairing or other wireless connection. For example, a user can interact with their mobile device to scan for furnishing units nearby, and can elect to connect to a furnishing unit to facilitate control of the furnishing unit.

In various embodiments, the at least one heating element is fully encased within at least one of: the seat back or the seat bottom. The seat back and/or the seat bottom can comprise a rigid material, semi-rigid material, uniform material, stock construction material, 3D printed material, additive manufactured material, or other material.

In various embodiments, at least one heating element is fully encased within an arm of the seating unit, at least one another portion of the seating unit, at least one portion of a table, and/or at least one portion of another type of furnishing unit. This other portion of the seating unit, table, and/or other type of furnishing unit can comprise a rigid material, semi-rigid material, uniform material, stock construction material, 3D printed material, additive manufactured material, or other material.

In various embodiments, the seat back, the seat bottom, and/or other portion of the seating unit, table, and/or other type of furnishing unit, are 3D printed via a 3D printing process and/or additive manufacturing process. In various embodiments, the at least one heating element is fully encased within the seat back, the seat bottom, and/or other portion of the seating unit, table, and/or other type of furnishing unit based on the 3D printing process comprising switching from 3D printing via a flowable base material to 3D printing via a flowable resistive metal component at least once during the 3D printing process, where the at least one heating element is implemented via the flowable resistive metal component. In various embodiments, the seat back, seat bottom, and/or other portion of the seating unit, table, and/or other type of furnishing unit are printed via a 3D printing material that includes a heat storage medium and/or a phase change material. The heat storage medium and/or the phase change material can facilitate delivery of the heating via the heating element to the user.

In various embodiments, the seat back, the seat bottom, and/or other portion of the seating unit, table, and/or other type of furnishing unit, are additive manufactured via an additive manufacturing process. In various embodiments, the at least one heating element is fully encased within the seat back, the seat bottom, and/or other portion of the seating unit, table, and/or other type of furnishing unit based on the additive manufacturing process comprising switching from additive manufacturing via a flowable base material to additive manufactured via a flowable resistive metal component at least once during the additive manufacturing process, where the at least one heating element is implemented via the flowable resistive metal component. In various embodiments, the seat back, seat bottom, and/or other portion of the seating unit, table, and/or other type of furnishing unit are printed via an additive manufactured material that includes a heat storage medium and/or a phase change material. The heat storage medium and/or the phase change material can facilitate delivery of the heating via the heating element to the user.

In various embodiments, the seat back, the seat bottom, and/or other portion of the seating unit, table, and/or other type of furnishing unit, is structurally implemented by comprising a structural material, such as the stock manufacturing material, 3D printed material, additive manufacture material, phase change material, heat storage medium, heat spreader medium, or other material that is self-heating, and/or that otherwise structurally implements the portion of the furniture while also implementing the one or more heating elements themselves. For example, such materials, when receiving power and/or when releasing stored heat, supply heating 105 by implementing heating element 102 in addition to structurally implementing some or all structural portions of the furnishing unit itself, such as the seat back, the seat bottom, one or more seat arms, the table top, and/or other structural portions of a corresponding seating unit, table, and/or other type of furnishing unit. In such embodiments, an additional heating pad and corresponding heating cover, and/or other type of heating element 105, is optionally not embedded within and/or mounted to a surface of the seat back, seat bottom, and/or other portions of a seating unit, table, and/or other type of furnishing unit 110, as the seat back, seat bottom, and/or other portions of a seating unit, table, and/or other type of furnishing unit 110 implement the heating element 105 via their material. In such embodiments, the furnishing unit 110 simply includes a controller PCB, such as PCB element 133 with a PCB 333, and corresponding embedded wiring to apply power to the material, where the powering is controlled via the PCB 333 and drawn from an AC power input or other power supply 205.

Any of the systems, platforms, tools, engines, utilities, methods, processes, functions and/or features described herein can be implemented via one or more modules as described below. Such module(s) can further include one or more wired or wireless network interfaces that communicate digital information such as bit streams, signals or other data via a network, such as the Internet or other wide area network, a local area network, a private network, a radio access network, a telecommunications network and/or other communication network. The digital information can be communicated bidirectionally with a computer, mobile communication device or other client device, a web server, storage network device and/or other computing or display device.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions-even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A seating unit comprising:

a seat back having a front side and a back side;

a seat bottom having a top side and an underside;

a first heating element, attached to the back side of the seat back, and configured to deliver first heating through the seat back to a user while seated in the seating unit when electrically powered;

a second heating element, attached to the underside of the seat bottom, and configured to deliver second heating through the seat bottom to the user while seated in the seating unit when electrically powered;

circuitry configured to facilitate delivery of power to the first heating element and the second heating element;

a lighting element integrated within the seating unit behind a translucent logo upon a surface of the seating unit, wherein the lighting element is configured to backlight the translucent logo to present a display which changes dynamically; and a drainage element having a drainage element cavity at the back end of the seat bottom;

wherein the seating unit is configured to be positioned upon a planar surface for seating by the user;

wherein the seat bottom comprises a front end and a back end, wherein the front end of the seat bottom is a first distance from the planar surface when the seating unit rests upon the planar surface, wherein the back end of the seat bottom is a second distance from the planar surface when the seating unit is positioned upon the planar surface, and wherein the second distance is smaller than the first distance;

wherein the drainage element cavity is configured to process flow of precipitation landing upon the seat bottom resulting from flowing of the precipitation from the front end to the back end based on the second distance being smaller than the first distance.

2. The seating unit of claim 1, wherein the first heating element and the second heating element each comprise a first film of resistive material deposited on a substrate.

3. The seating unit of claim 2, wherein the first film is deposited as a first pattern, and wherein first heating element and the second heating element each further comprise a second film of conducting material deposited on the substrate, the second film deposited as a second pattern electrically connected to the first pattern.

4. The seating unit of claim 1, further comprising:

input and output terminals for transferring power to the first heating element and the second heating element, the input and output terminals connected to a power transfer unit mounted to the seating unit; and a power lead configured to interconnect a power source and the power transfer unit.

5. The seating unit of claim 4, further wherein the power transfer unit is an easy release power transfer device having first and second parts held together in a normal state by at least one of: friction or magnetism.

6. The seating unit of claim 4, wherein a second seating unit includes the power source, wherein the power lead interconnects the power source and the power transfer unit based on attaching to a second power lead of the second seating unit, and wherein the second seating unit powers at least one heating element of the second seating unit via the power source.

7. The seating unit of claim 6, further comprising a second power lead supplying power to a third seating unit, wherein the third seating unit powers at least one heating element of the second seating unit via the power supplied by the seating unit via the second power lead.

8. The seating unit of claim 1, wherein the circuitry causes the first heating element and the second heating element to change between a set of at least three heating states, wherein a first heating state of the set of at least three heating states corresponds to delivering heating via a first intensity, wherein a second heating state of the set of at least three heating states corresponds to delivering heating via a second intensity that is lower than the first intensity, and wherein a third heating state of the set of at least three heating states corresponds to delivering no heating.

9. The seating unit of claim 8, further comprising:

a user input button, wherein a switch of the circuitry is actuated based on pressing of a user input button attached to the seating unit, wherein actuation of the switch causes the first heating element and the second heating element to change between different ones of the set of at least three heating states in accordance with a cyclical ordering of the set of at least three heating states.

10. The seating unit of claim 8, further comprising:

a communications interface, wherein data received via the communications interface is processed via the circuitry to cause the first heating element and the second heating element to change between different ones of the set of at least three heating states.

11. The seating unit of claim 10, wherein the data received via the communications interface includes weather data, and wherein updating to a new one of the set of at least three heating states is based on the weather data.

12. The seating unit of claim 1, wherein the first heating element is implemented as a first heating pad, wherein the second heating element is implemented as a second heating pad, further comprising:

a heating pad cover plate comprising a vertical covering component and a horizontal covering component; and wherein a first side of the first heating pad is secured against the back side of the seat back, and wherein a second side of the first heating pad opposite the first side of the first heating pad is secured against an inner surface of the vertical covering component of the heating pad cover plate.

13. The seating unit of claim 12, wherein a first side of the second heating pad is secured against the underside of the seat bottom, and wherein a second side of the second heating pad opposite the first side of the second heating pad is secured against an inner surface of the horizontal covering component of the heating pad cover plate.

14. A seating unit comprising:

a seat back;

a seat bottom;

at least one heating element configured to deliver heating when electrically powered to a user while seated in the seating unit through at least one of: the seat back or the seat bottom;

at least one additional electrically powered element;

circuitry configured to facilitate delivery of power to the at least one heating element and further configured to facilitate delivery of power to at least one additional electrically powered element;

a first lighting element integrated within the seating unit behind a translucent logo upon a surface of the seating unit, wherein the first lighting element is configured to backlight the translucent logo to present a display which changes dynamically; and a drainage element having a drainage element cavity at the back end of the seat bottom;

wherein the seating unit is configured to be positioned upon a planar surface for seating by the user;

wherein the seat bottom comprises a front end and a back end, wherein the front end of the seat bottom is a first distance from the planar surface when the seating unit rests upon the planar surface, wherein the back end of the seat bottom is a second distance from the planar surface when the seating unit is positioned upon the planar surface, and wherein the second distance is smaller than the first distance; and wherein the drainage element cavity is configured to process flow of precipitation landing upon the seat bottom resulting from flowing of the precipitation from the front end to the back end based on the second distance being smaller than the first distance.

15. The seating unit of claim 14, wherein the at least one electrically powered element includes at least one of:

a second lighting element attached to an underside of one of: the seat bottom or at least one arm of the seating unit, wherein the second lighting element is configured to illuminate a surface below the seating unit upon which the seating unit is positioned; or a charging coil of a wireless changing station, wherein the charging coil is configured to charge a mobile device when resting upon a corresponding surface of the seating unit.

16. The seating unit of claim 14, wherein the at least one electrically powered element includes at least one communication interface that facilitates wireless connection with a mobile device enabling user configuration, of at least one of: the at least one heating element, or at least one further additional electrically powered element, wherein the user configuration is enabled via at least one of: a preset user profile accessed via the mobile device, or user interaction with a graphical user interface displayed via the mobile device.

17. A seating unit comprising:

A seat back;

A seat bottom;

at least one heating element fully encased within at least one of: the seat back or the seat bottom, and configured to deliver heating when electrically powered to a user while seated in the seating unit;

circuitry configured to facilitate delivery of power to the at least one heating element;

a lighting element integrated within the seating unit behind a translucent logo upon a surface of the seating unit, wherein the lighting element is configured to backlight the translucent logo to present a display which changes dynamically; and a drainage element having a drainage element cavity at the back end of the seat bottom;

wherein the seating unit is configured to be positioned upon a planar surface for seating by the user;

wherein the seat bottom comprises a front end and a back end, wherein the front end of the seat bottom is a first distance from the planar surface when the seating unit rests upon the planar surface, wherein the back end of the seat bottom is a second distance from the planar surface when the seating unit is positioned upon the planar surface, and wherein the second distance is smaller than the first distance;

wherein the drainage element cavity is configured to process flow of precipitation landing upon the seat bottom resulting from flowing of the precipitation from the front end to the back end based on the second distance being smaller than the first distance.

18. The seating unit of claim 17, wherein the seating unit, wherein the seat back and the seat bottom are constructed as at least one piece of stock construction material.

19. The seating unit of claim 17, wherein the at least one heating element is fully encased within at least one of: the seat back or the seat bottom based on a 3D printing process comprising switching from 3D printing via a flowable base material to 3D printing via a flowable resistive metal component at least once during the 3D printing process, wherein the at least one heating element is implemented via the flowable resistive metal component.

20. The seating unit of claim 17, wherein the seat back and seat bottom are printed via a 3D printing material that includes at least one of: a heat storage medium or a phase change material, and wherein the at least one of: a heat storage medium or the phase change material facilitates delivery of the heating via the heating element to the user.

* * * * *